US006853758B2

(12) United States Patent
Ridgway et al.

(10) Patent No.: US 6,853,758 B2
(45) Date of Patent: Feb. 8, 2005

(54) SCHEME FOR CONTROLLING POLARIZATION IN WAVEGUIDES

(75) Inventors: Richard William Ridgway, Westerville, OH (US); David William Nippa, Dublin, OH (US)

(73) Assignee: Optimer Photonics, Inc., Columbus, OH (US)

( * ) Notice: Subject to any disclaimer, the term of this patent is extended or adjusted under 35 U.S.C. 154(b) by 49 days.

(21) Appl. No.: 10/302,793

(22) Filed: Nov. 22, 2002

(65) Prior Publication Data

US 2004/0008916 A1 Jan. 15, 2004

Related U.S. Application Data

(60) Provisional application No. 60/395,590, filed on Jul. 12, 2002.

(51) Int. Cl.[7] .............................................. G02F 1/035
(52) U.S. Cl. ........................ 385/2; 359/245; 359/246
(58) Field of Search ............................... 385/2, 11, 14, 385/28, 39, 40, 123, 129

(56) References Cited

U.S. PATENT DOCUMENTS

| | | | |
|---|---|---|---|
| 4,070,094 A | | 1/1978 | Martin |
| 4,877,299 A | * | 10/1989 | Lorenzo et al. ................ 385/3 |
| 4,936,645 A | | 6/1990 | Yoon et al. |
| 5,078,511 A | * | 1/1992 | Noll et al. ...................... 385/3 |
| 5,151,959 A | | 9/1992 | Mueller et al. |
| 5,315,422 A | | 5/1994 | Utaka et al. |
| 5,546,480 A | | 8/1996 | Leonard |
| 5,751,867 A | | 5/1998 | Schaffner et al. |
| 5,790,719 A | * | 8/1998 | Mitomi et al. ................. 385/2 |
| 5,822,100 A | | 10/1998 | Robinson et al. |
| 5,862,276 A | | 1/1999 | Karras |
| 5,894,532 A | | 4/1999 | Moores |
| 5,970,186 A | | 10/1999 | Kenney et al. |
| 6,046,839 A | | 4/2000 | Ito et al. |
| 6,345,131 B1 | * | 2/2002 | Jang et al. ..................... 385/16 |
| 6,522,793 B1 | * | 2/2003 | Szilagyi et al. ................ 385/2 |
| 6,538,787 B1 | * | 3/2003 | Moeller et al. ............. 398/158 |
| 6,687,425 B2 | * | 2/2004 | Ridgway et al. .............. 385/14 |

FOREIGN PATENT DOCUMENTS

| | | |
|---|---|---|
| GB | 2 236 402 A | 4/1991 |
| JP | 05 323243 | 12/1993 |
| JP | 09 090299 | 4/1997 |

OTHER PUBLICATIONS

Hu et al.; Tunable Mach–Zehnder Polarization Splitter Using Height–Tapered Y–Branches; 1997; 773–775.
Interferometric–Type Polarisation Splitter on Z–Propagating LiNbO3 : Ti; Electronics Letters; 1990.

(List continued on next page.)

*Primary Examiner*—Akm Enayet Ullah
*Assistant Examiner*—Jennifer Doan
(74) *Attorney, Agent, or Firm*—Dinsmore & Shohl LLP

(57) ABSTRACT

The present invention present a means for addressing PDL, PMD, and other polarization-related performance issues in optical components and systems. In accordance with one embodiment of the present invention, an integrated optical device is provided. The device comprises: (i) first and second optical waveguide arms arranged to define an optical signal splitting region near an input side of the integrated optical device and an optical signal combining region near an output side of the integrated optical device and (ii) a functional region between the optical signal splitting and combining regions. The first and second optical waveguide arms comprise first and second waveguide cores passing through a first electrooptic portion of the functional region. First and second sets of control electrodes are positioned to generate electric fields in the first and second portions of the functional region. The first set of control electrodes and the first waveguide core are positioned to be TE mode predominant and the second set of control electrodes and the second waveguide core are positioned to be TM mode predominant.

61 Claims, 14 Drawing Sheets

OTHER PUBLICATIONS

HF Schilaak, Modulation Behaviour of Integrated Optical Couplers, Journal of Optical Communications, 1984, 122–131.

EAJ Marcatili, Dielectric Rectangular Waveguide and Directional Coupler for Integrated Optics, Bell Syst. tech. J., vol. 48, pp. 22–111, Sep. 1969.

C. Themistos, BM Azizur Rahman, Kenneth TV Grattan, Design Considerations for an Electrooptic Directional Coupler Modulator, Journal of Lightwave Technology, vol. 17, No. 4, Apr. 1999.

Arkady Kaplan, Shlomo Ruschin; Layout For Polarization Insensitive Modulation In LiNbO3 Waveguides; IEEE Journal of Selected Topics In Quantum Electronics; Jan. 2000; pp. 83–87: vol. 6 No. 1: IEEE: Israel.

PJ Duthie, C Edge; A Polarization Independent GuidedWave LiNbO3 Electrooptic Switch Employing Polarization Diversity; IEEE Photonics Technology Letters, pp. 136–137, vol. 3, No. 2: Feb. 1991.

Takashi Saida, Koichi Takiguchi Shoichiro Kuwaiiara, Yoshiaki Kisaka. Yutaka Miyamoto, Yasuaki Hashizume, Tomohiro Shibata, Katsunari Okamoto. Planer_Lightwave Circuit Polarization–Mode Dispersion Compensator IEEE Photonics Technology Letters, pp. 507–509; vol. 14, No. 4; Apr. 2002.

Yu–Pin Liao, Ruei–Chang Lu; Design and Fabrication of Wide–Angle TF.–TM Mode Splitter in Lithium Niobate; IEEE Journal of Selected Topics in Quantum Electronics; pp. 88–93; vol. 6, No. 1, Jan./Feb. 2000.

Parker, M.C. et al: "Multiple–order PMD Compensation Uisng a Single Actively Chirped AWG", Proceedings 27th European Conference on Optical Communication, Amsterdam, Netherlands, Sep. 30–Oct. 4, 2001; vol. 3, Sep. 30, 2001 pp. 424–425.

\* cited by examiner

FIG. 13A
FIG. 13B
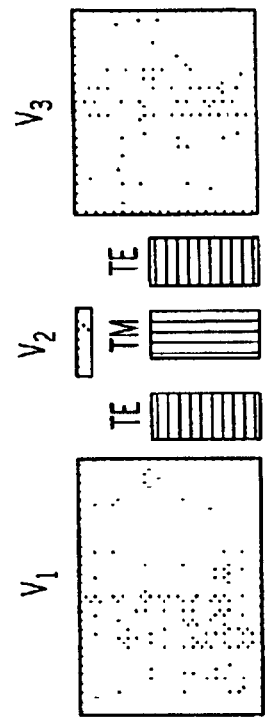
FIG. 13C
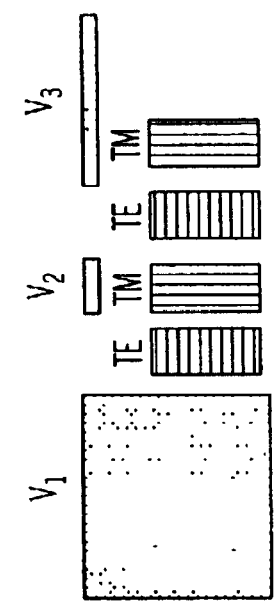
FIG. 13D

SCHEME FOR CONTROLLING POLARIZATION IN WAVEGUIDES

CROSS-REFERENCE TO RELATED APPLICATIONS

This application claims the benefit of U.S. Provisional Application Ser. No. 60/395,590, filed Jul. 12, 2002. This application is related to U.S. patent application Ser. No. 09/916,238, filed Jul. 26, 2001 and Ser. Nos. 10/098,730 and 10/098,731, filed Mar. 15, 2002.

BACKGROUND OF THE INVENTION

The present invention relates to the propagation, modulation, and switching of optical signals in optical devices and, more particularly, to the polarization of the optical signals. Modern telecommunications networks, for example, utilize a variety of optical components to affect propagation, modulation, and switching of optical signals and the present invention presents a scheme for enhancing the performance of such networks by controlling the polarization of the optical signals in the network. For the purposes of defining and describing the present invention, it is noted that polarization "control" is not limited to mere alteration of the polarization state of an optical signal but contemplates, among other things, polarization-specific attenuation, delay, or other polarization-specific treatment of an optical signal as well.

BRIEF SUMMARY OF THE INVENTION

The polarization direction of light propagating in optical fiber and the associated optical components is usually unknown and may fluctuate over time. For this reason, optical components that switch, attenuate, amplify or process the light in the optical fiber need to carry out their function without regard to polarization or, in other words, be polarization independent. This leads to requirements for low polarization dependent loss (PDL) and low polarization mode dispersion (PMD). Unfortunately, many optical components have polarization dependence due to mechanical disturbances, environmental fluctuations, or asymmetries in the geometrical properties of the component, to name a few. Many embodiments of the present invention present a means for addressing PDL, PMD, and other polarization-related performance issues in optical components.

In accordance with one embodiment of the present invention, an integrated optical device is provided. The device comprises: (i) first and second optical waveguide arms arranged to define an optical signal splitting region near an input side of the integrated optical device and an optical signal combining region near an output side of the integrated optical device and (ii) a functional region between the optical signal splitting and combining regions. The first optical waveguide arm comprises a first waveguide core passing through a first electrooptic portion of the functional region. The second optical waveguide arm comprises a second waveguide core passing through a second electrooptic portion of the functional region. A first set of control electrodes are positioned to generate an electric field in the first portion of the functional region. A second set of control electrodes are positioned to generate an electric field in the second portion of the functional region. The first set of control electrodes, the first waveguide core, and the first portion of the functional region are configured such that a TE electromagnetic polarization mode of an optical signal propagating along the first waveguide core encounters an electrooptically induced change in refractive index that is more predominant than an electrooptically induced change in refractive index encountered by a TM electromagnetic polarization mode of the optical signal propagating along the first waveguide core. The second set of control electrodes, the second waveguide core, and the second portion of the functional region are configured such that a TM electromagnetic polarization mode of an optical signal propagating along the second waveguide core encounters an electrooptically induced change in refractive index that is more predominant than an electrooptically induced change in refractive index encountered by a TE electromagnetic polarization mode of the optical signal propagating along the second waveguide core.

In accordance with another embodiment of the present invention, an integrated optical device configured for splitting TE and TM modes of an optical signal is provided. The device comprises: (i) first and second optical waveguide arms arranged to define an optical signal splitting region near an input side of the integrated optical device and an optical signal combining region near an output side of the integrated optical device, (ii) a functional region between the optical signal splitting and combining regions, and (iii) a controller coupled to the functional region. The controller is programmed to establish the voltages applied to the first and second sets of control electrodes to affect optical coupling at the optical signal combining region of TE and TM polarized portions of the optical signals propagating along the first and second waveguide cores such that one of the first and second waveguide cores following the optical signal combining region includes an enhanced TE signal while the other of the first and second waveguide cores following the optical signal combining region includes an enhanced TM signal.

In accordance with yet another embodiment of the present invention, a method of operating an integrated optical device configured for splitting TE and TM modes of an optical signal is provided. According to the method, suitable voltages are applied to the first and second set of control electrodes associated with respective ones of two optical waveguide arms to TE and TM predominant portions of a functional region of the waveguide device. The voltages applied to the first and second sets of control electrodes are established to affect optical coupling at the optical signal combining region of TE and TM polarized portions of the optical signals propagating along the first and second waveguide cores such that one of the first and second waveguide cores following the optical signal combining region includes an enhanced TE signal while the other of the first and second waveguide cores following the optical signal combining region includes an enhanced TM signal.

In accordance with yet another embodiment of the present invention, an integrated optical device configured for variable optical attenuation of an optical signal is provided. In this embodiment of the present invention, the optical device includes a controller is programmed to establish the voltages applied to the first and second sets of control electrodes to affect selective attenuation of TE and TM polarized portions of an optical signal coupled to an input port of a selected one of the waveguide cores on the input side of the integrated optical device. In this manner, the TE and TM polarized portions of the optical signal are attenuated to substantially equal extents at an output port of the selected waveguide core on the output side of the integrated optical device.

In accordance with yet another embodiment of the present invention, a method of operating an integrated optical device configured for variable optical attenuation of TE and TM modes of an optical signal is provided. According to the method, voltages are applied to the first and second sets of control electrodes to affect selective attenuation of TE and TM polarized portions of an optical signal coupled to an input port of a selected one of the waveguide cores on the input side of the integrated optical device, such that the TE and TM polarized portions of the optical signal are attenuated to substantially equal extents at an output port of the selected waveguide core on the output side of the integrated optical device.

In accordance with yet another embodiment of the present invention, an integrated optical device configured to control delay in respective TE and TM modes of polarization of an optical signal is provided. The device comprises a polarization splitter, a polarization combiner, and a delay section. The polarization splitter is configured to direct a TE mode of an input optical signal to a first optical waveguide arm of the device and a TM mode of the input optical signal to a second optical waveguide arm of the device. The polarization combiner is configured to combine the TE mode of the first optical waveguide arm with the TM mode of the second optical waveguide arm into an output optical signal. The delay section is positioned in a propagation path between the polarization splitter and the polarization combiner and is configured to affect a relative phase delay between the TE mode of polarization in the first optical waveguide arm and the TM mode of polarization in the second optical waveguide arm.

In accordance with yet another embodiment of the present invention, a method of controlling delay in respective TE and TM modes of polarization of an optical signal in an integrated optical device is provided. The method comprises (i) splitting TE and TM polarized components of an optical signal with a polarization splitter by directing a TE mode of an input optical signal to a first optical waveguide arm of the device and directing a TM mode of the input optical signal to a second optical waveguide arm of the device; (ii) combining the split TE and TM modes of polarization with a polarization combiner by combining the TE mode of the first optical waveguide arm with the TM mode of the second optical waveguide arm into an output optical signal; and (iii) prior to combining the TE and TM modes of polarization, affecting a relative phase delay between the TE mode of polarization in the first optical waveguide arm and the TM mode of polarization in the second optical waveguide arm in a delay section in a propagation path between the polarization splitter and the polarization combiner.

In accordance with yet another embodiment of the present invention, an integrated optical device configured to convert a selected TE or TM mode of polarization of an optical signal is provided. The device comprises a polarization splitter, a polarization rotator, a delay section, and an output coupler. The polarization splitter is configured to direct a TE mode of an input optical signal to a first optical waveguide arm of the device and a TM mode of the input optical signal to a second optical waveguide arm of the device. The polarization rotator is positioned in one of the first and second optical waveguide arms to rotate a polarization mode of an optical signal following propagation through the polarization splitter. The delay section is in a propagation path between the polarization splitter and the polarization combiner and is configured to affect a relative phase delay between signals in the first and second optical waveguide arms. The output coupler is configured to combine optical signals of the first and second optical waveguide arms following propagation through the delay section.

In accordance with yet another embodiment of the present invention, a method of converting a selected TE or TM mode of polarization of an optical signal in an integrated optical device is provided. The method comprises the steps of (i) splitting TE and TM polarized components of an optical signal with a polarization splitter by directing a TE mode of an input optical signal to a first optical waveguide arm of the device and directing a TM mode of the input optical signal to a second optical waveguide arm of the device; (ii) rotating a mode of polarization of one of the TE and TM polarized components in one of the first and second optical waveguide arms following propagation of the optical signal through the polarization splitter; (iii) causing a relative phase delay between optical signals in the first and second optical waveguide arms following the rotation of one of the TE and TM polarized components of the optical signal; and (iv) combining optical signals of the first and second optical waveguide arms following causation of the relative phase delay.

In accordance with yet another embodiment of the present invention an optical network is provided comprising at least one transmitter, at least one receiver, a network of transmission lines interconnecting the transmitter and the receiver, and at least one integrated optical device according to the present invention.

In accordance with yet another embodiment of the present invention an optical network is provided comprising at least one transmitter, at least one receiver, a network of transmission lines interconnecting the transmitter and the receiver, at least one optical component, a polarization dependent phase shifter, and a phase shift controller. The optical component is configured to introduce a polarization dependent phase delay in an optical signal propagating through the optical network. The controller is programmed to compensate for the polarization dependent phase delay introduced by the optical component by inducing a suitable change in the refractive indices encountered by the TE and TM polarization modes of the optical signal.

Accordingly, it is an object of the present invention to provide a variety of optical waveguide devices that utilize polarization control to enhance the functionality of the devices and systems employing the devices. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which:

FIGS. 13A–13H are schematic illustrations of a variety of electrode/core configurations according to the present invention.

DETAILED DESCRIPTION

Figure 1A:
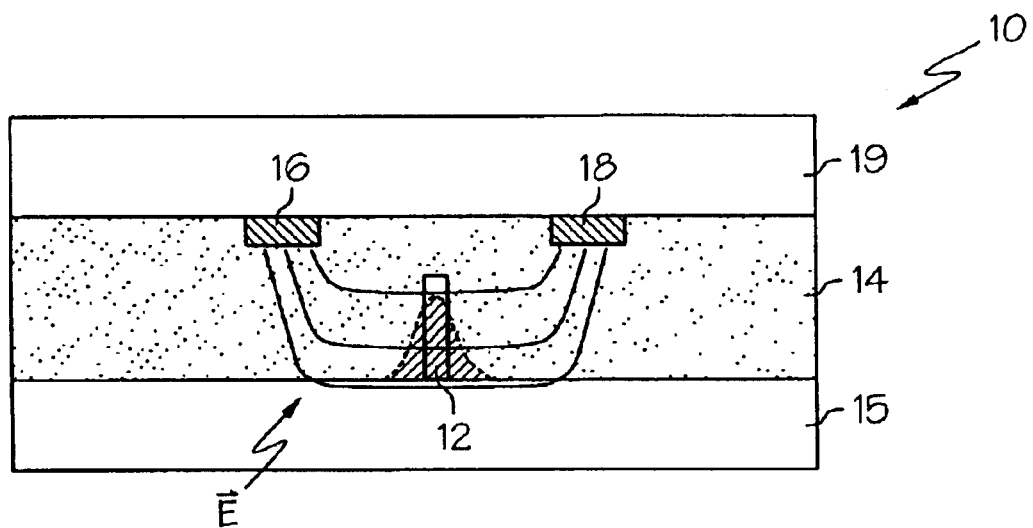
FIGS. 1A and 1B illustrate electrode/core configurations according to the present invention.

Functional cladding materials can be utilized in optical waveguide devices to alter the effective refractive index of the optical waveguide. Although the present invention is specifically illustrated in the context of an optical waveguide including an electrooptic functional cladding material, the functional material may be thermooptic, electrooptic, magnetooptic, or another controllable optical material. For the purposes of defining and describing the present invention, it is noted that the wavelength of "light" or an "optical signal" is not limited to any particular wavelength or portion of the electromagnetic spectrum. Rather, "light" and "optical signals," which terms are used interchangeably throughout the present specification and are not intended to cover distinct sets of subject matter, are defined herein to cover any wavelength of electromagnetic radiation capable of propagating in an optical waveguide. For example, light or optical signals in the visible and infrared portions of the electromagnetic spectrum are both capable of propagating in an optical waveguide. An optical waveguide may comprise any suitable signal propagating structure. Examples of optical waveguides include, but are not limited to, optical fibers, slab waveguides, and thin-films used, for example, in integrated optical circuits.

In the context of an electrooptically clad waveguide, the refractive index of the waveguide changes under application of an electric field. The change in refractive index is dependent on the orientation of the applied electric field, the orientation of the electrooptic coefficient of the cladding material, and the orientation of the light propagating along the waveguide. In some electrooptic materials, such as electrooptic crystals (i.e. lithium niobate), the orientation of the electrooptic coefficient is fixed while the crystal is being grown. However, in some electrooptic polymers, the orientations of the electrooptic coefficients are set during the poling process or vary as a function of applied electric field and can be made to form any number of orientations.

A number of waveguide/electrode configurations are discussed below with reference to FIGS. 1A–1B and 13A–13H. The positioning of the waveguide within the contoured electric field alters the relative efficiency of the electrooptic interaction with the two dominant polarizations. In some configurations, the TE polarization is altered more than the TM polarization. In other orientations, the opposite is true. For the purposes of describing and defining the present invention, it is noted that TE and TM polarized light represent two independent electromagnetic modes of an optical signal. The electromagnetic field distribution is referred to as the transverse electric (TE) mode where the electric field of the optical signal is perpendicular to the plane extending along the primary axis of propagation of the waveguide core. The electromagnetic field distribution is referred to as the transverse magnetic (TM) mode where the magnetic field of the optical signal is perpendicular to the plane extending along the primary axis of propagation of the waveguide core. It is also noted that in a channel waveguide of the illustrated type, the propagating modes are not purely TE or TM polarized. Rather, the modes are typically more predominantly one or the other and are commonly so designated. Accordingly, a TE polarized mode may merely comprise a distribution where the electric field component parallel to the plane of propagation is the largest component of the signal. Similarly, a TM polarized mode may merely comprise a distribution where the magnetic field component parallel to the plane of propagation is the largest component of the signal.

Electrooptic polymers can be poled in a contour to provide an electrooptic effect that is dependent on the position of the waveguide core within the contour. At positions where the contoured electric fields are predominately horizontal, the electrooptic effect will predominately alter TE polarized light. To a lesser extent (about ⅓) these horizontal fields will also affect the TM polarized light. At positions where the contoured electric fields are predominately vertical, the electrooptic effect will predominately alter the TM polarized light. Again, to a lesser extent (about ⅓), these vertical fields will affect the TE polarized light.

Figure 1B:
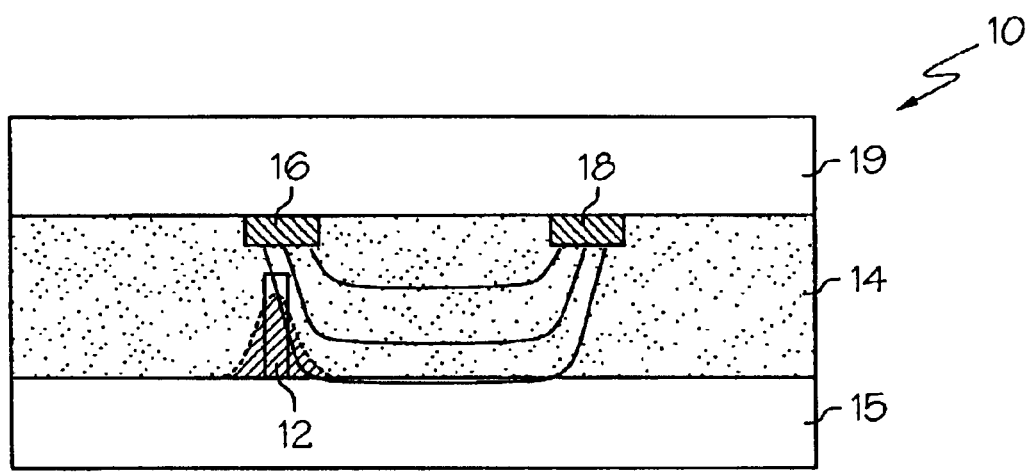

FIGS. 1A and 1B show two different waveguide/electrode configurations where a waveguide device 10 is provided including a functional cladding material 14 surrounding a core 12 and supported by a silica slab 15 and protected by an overlayer 19. First and second control electrodes 16, 18 are positioned to define an electric field across the functional cladding material 14. The intensity cross section of an optical signal propagating along the waveguide device 10 is also illustrated in FIGS. 1A and 1B. The specific compositions forming the components of the present invention are beyond the focus of the present invention and may be gleaned from state of the art waveguide technology. It is noted however, that electrooptic materials suitable for use in the present invention as the functional cladding material 14 should have an index of refraction that is lower than the index of the waveguide core bounded by the cladding layers. Such low-index materials are described in copending U.S. patent application Ser. No. 09/777,439, filed Feb. 6, 2001, entitled FUNCTIONAL MATERIALS FOR USE IN OPTICAL SYSTEMS, the disclosure of which is incorporated herein by reference.

Generally, the polymeric electrooptic materials disclosed in the above-noted patent application include thermoplastic or thermosetting polymers that are blended or co-polymerized with an electrooptic chromophore. The thermoplastic or thermosetting polymer is typically selected from the group consisting of acrylics/methacrylics, polyesters, polyurethanes, polyimides, polyamides, polyphosphazenes, epoxy resins, and hybrid (organic-inorganic) or nanocomposite polyester polymers. Combinations of thermoplastic and thermosetting polymers (interpenetrating polymer networks) are also contemplated. The thermoplastic and/or thermosetting polymers typically have glass transition temperatures above 100° C. One embodiment for low-index materials has a refractive index value less than 1.5 while another embodiment for high-index materials has a refractive index value greater than 1.5. The polymers are combined with chromophores, either as part of the backbone chain or blended and typically contain compatibilization additives or groups and/or adhesion-promotion additives or groups. The electrooptic chromophore according to the invention is typically a substituted aniline, substituted azobenzene, substituted stilbene, or substituted imine.

In FIG. 1A, the waveguide device 10 includes a core 12 located between the first and second control electrodes 16, 18 at a position where the electric field E is predominately horizontal. In such a configuration, TE oriented light will be altered more than TM oriented light. In the configuration of FIG. 1B, the waveguide 10 includes a core 12 located closer to one of the electrodes 16, 18 at a position where the electric field E is predominately vertical. In such a configuration, the TM oriented light is altered more than the TE oriented light.

Figure 2:
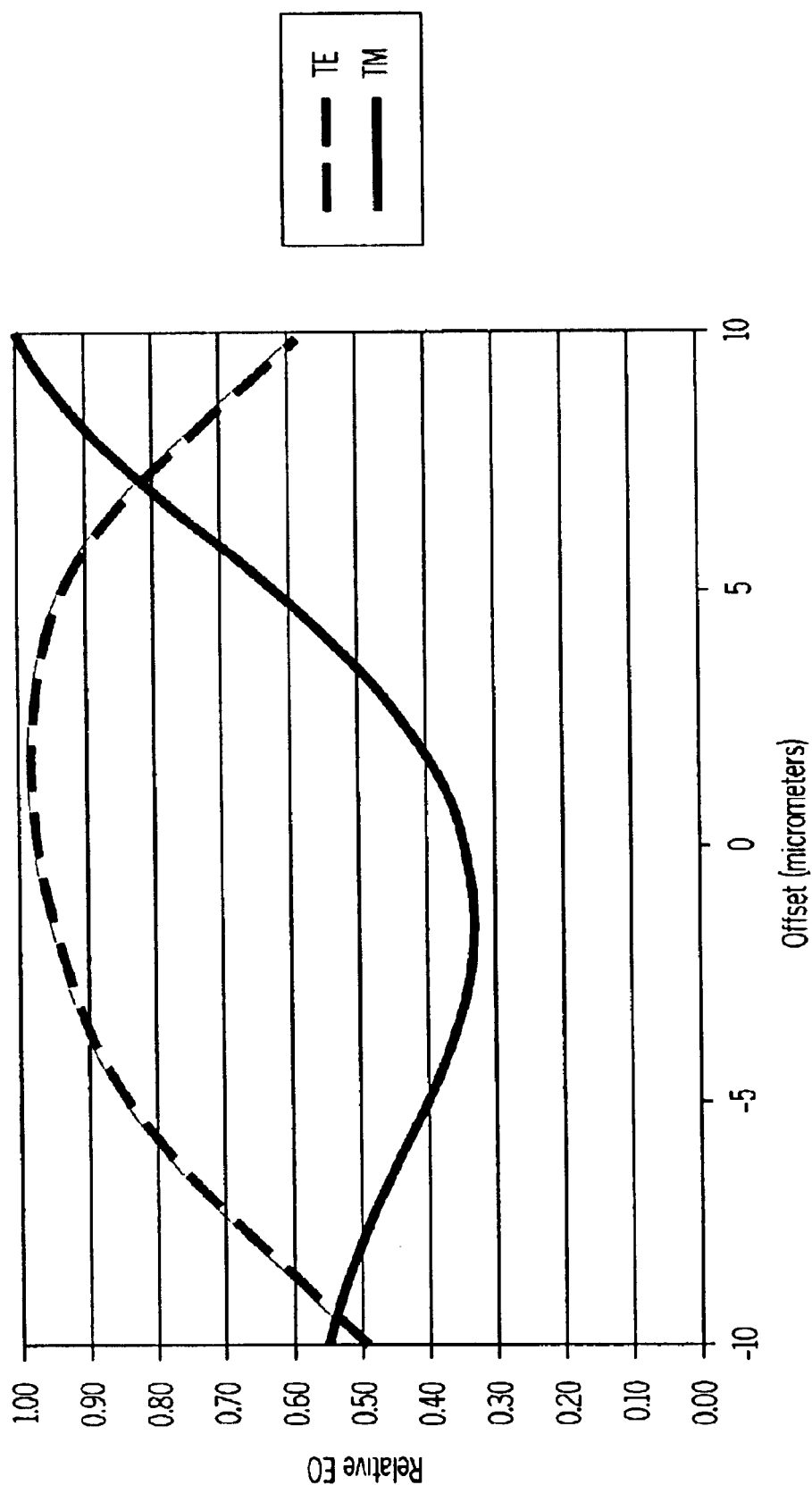
FIG. 2 illustrates relative electrooptic effect as a function of the position of a waveguide core within a contoured electric field.

FIG. 2 shows the relative electrooptic effect as a function of the position of the waveguide core 12 within the contoured electric field E. In this example, the electrodes 16, 18 are positioned 15 micrometers apart and the top of the waveguide core 12 is positioned 3 microns below the plane of the electrodes 16, 18. As is illustrated in FIG. 2, when the waveguide core 12 is positioned between the electrodes 16, 18 in the manner illustrated in FIG. 1A, the TE polarized light is influenced about 3 times as much as the TM polarized light. Similarly, when the waveguide core 12 is positioned directly beneath one of the electrodes 16, 18 in the manner illustrated in FIG. 1B, the TM polarized light is influenced about 3 times as much as the TE polarized light.
Polarization Splitter/Switch.

Figure 3A:
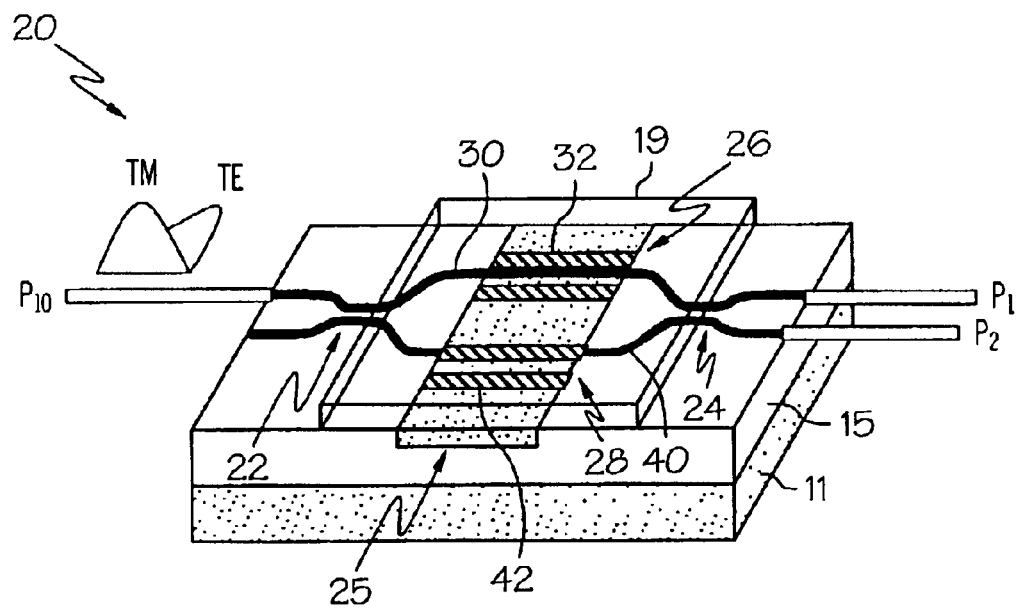
FIGS. 3A and 3B illustrate an integrated optical device according to one embodiment of the present invention.
Figure 3B:
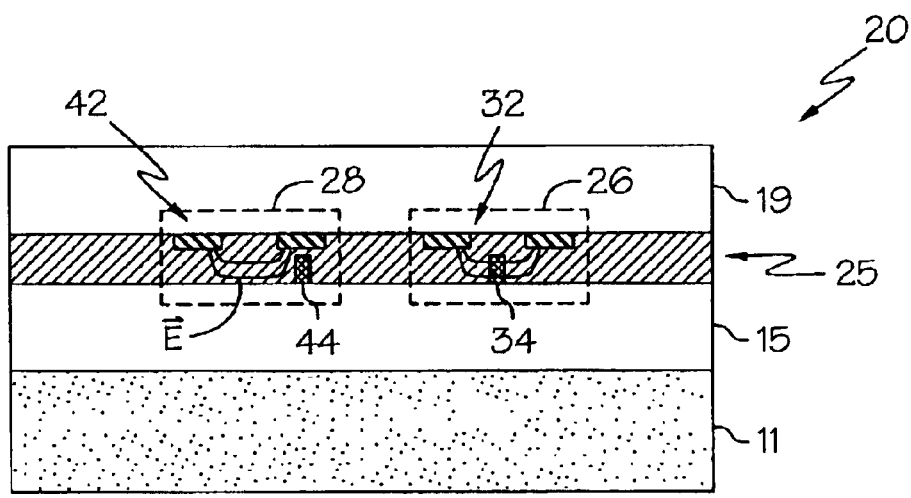

Referring now to FIGS. 3A and 3B, an integrated optical device 20 according to one embodiment of the present invention is illustrated. As is described in detail below, the device of FIGS. 3A and 3B is configured to split TE and TM polarizations of an optical signal input at $P_{10}$ and direct the respective modes of polarization selectively to a first output port at $P_1$, a second output port at $P_2$, or both output ports at $P_1$ and $P_2$. Specifically, FIG. 3 shows an integrated optical device 20 having first and second optical waveguide arms 30, 40 arranged to define a first directional coupling region 22 near an input side of the integrated optical device 20 and a second directional coupling region 24 near an output side of the integrated optical device 20.

A functional region 25 is defined between the first and second coupling regions 22, 24 and includes first and second electrooptic portions 26, 28 corresponding respectively to the first and second waveguide arms 30, 40. First and second sets of control electrodes are associated with respective ones of the first and second electrooptic portions 26, 28 of the functional region 25. The first and second electrooptic portions 26, 28 may be rendered electrooptic by the presence of an electrooptic cladding 14, as is illustrated in FIGS. 1A and 1B, or an electrooptic waveguide core 16, or both. In any case, it will be appropriate to describe and define a waveguide core as "passing through" an electrooptic portion of the functional region, regardless of whether the core, cladding, or both the core and the cladding, are composed of an electrooptic material. Generally, the integrated optical device 20 includes a substrate 11, a silica slab 15, the functional region 25, and an insulative overlayer 19 and takes the form of a modified Mach-Zehnder interferometer configured for electrooptic control in each of the arms 30, 40.

Figure 4A:
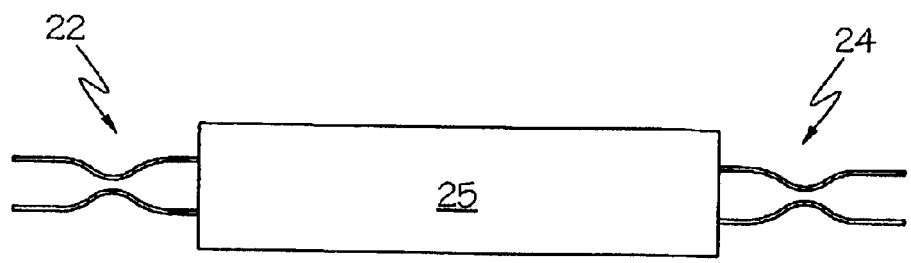
FIGS. 4A–4E illustrate a number of suitable alternative structures for splitting and combining optical signals.
Figure 4B:
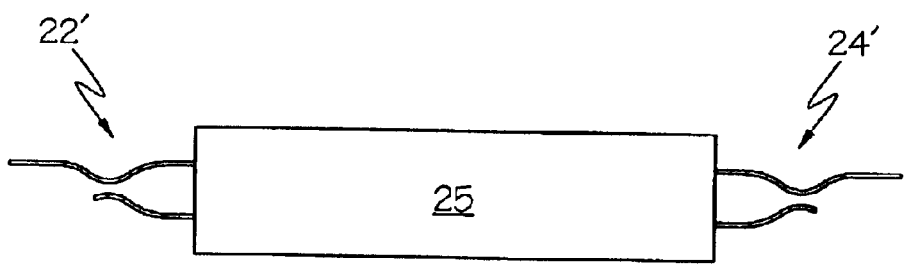
Figure 4C:
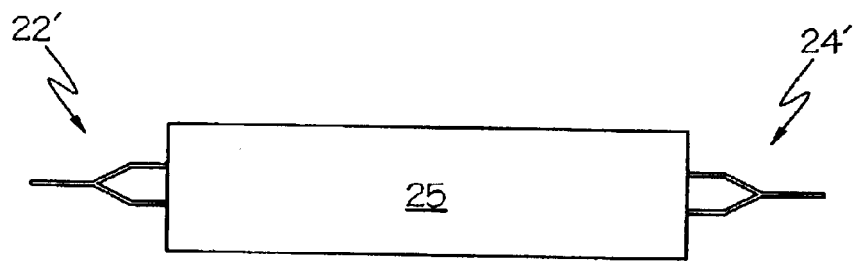
Figure 4D:
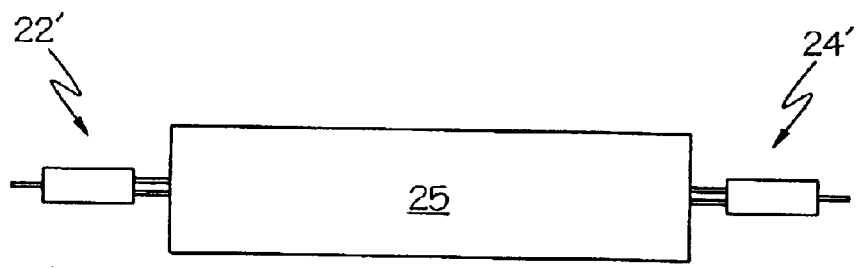
Figure 4E:
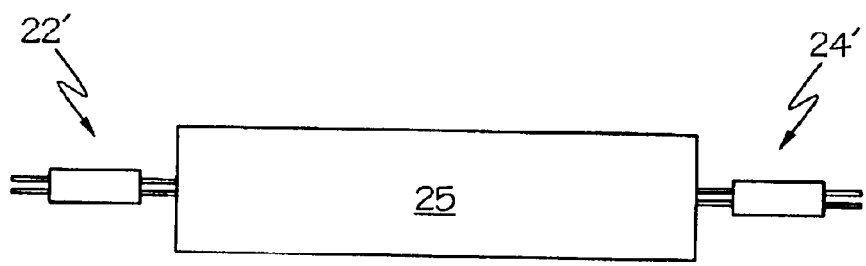

Although many embodiments of the present invention are illustrated herein with reference to optical signal splitters and combiners in the form of directional coupling regions, it is noted that the present invention contemplates utilization of any suitable conventional or suitable yet to be developed structure for optical signal splitting or combining. For example, referring to FIGS. 4A to 4E, a number of suitable alternative structures for splitting and combining optical signals are illustrated. FIG. 4A illustrates 2×2 directional coupling regions 22, 24 disposed on the input and output sides of the functional region 25. FIG. 4B illustrates 1×2 directional coupling regions 22', 24' disposed on the input and output sides of the functional region 25. FIG. 4C illustrates a 1×2 Y signal splitter 22' and combiner 24' disposed on the input and output sides of the functional region 25. FIG. 4D illustrates a 1×2 multimode interference element splitter 22' and a 1×2 multimode interference element combiner 24' disposed on the input and output sides of the functional region 25. FIG. 4E illustrates a 2×2 multimode interference element splitter 22' and a 2×2 multimode interference element combiner 24' disposed on the input and output sides of the functional region 25. The specific design parameters of these structures are beyond the scope of the present invention and may be gleaned from existing or yet to be developed sources.

Returning to the embodiment illustrated in FIGS. 3A and 3B, the directional coupling region 22 on the input side evenly splits the light into each arm 30, 40 of the device 20 independent of the polarization state of the input light. In the illustrated configuration, the first waveguide core 34 of the first arm 30 is positioned between the control electrodes 32 to predominately influence the TE component of the light. In the second arm 40, the second waveguide core 44 is positioned beneath one of the control electrodes 42 to predominately influence the TM polarization.

Given an input signal having an input intensity $P_{10}$, the output intensities $P_1, P_2$ can be described using the following two equations:

$$P_1 = P_{10}\sin^2\left(\frac{\pi n L}{\lambda}\right)$$

$$P_2 = P_{10}\cos^2\left(\frac{\pi n L}{\lambda}\right)$$

where L is the length of the first and second waveguide arms 30, 40, λ is the wavelength of the input light, and n is the refractive index of the arms 30, 40.

With electrooptic control, the effective refractive index of each arm 30, 40 can be varied by utilizing the first and second sets of control electrodes 32, 42 to create respective electric fields in first and second portions 26, 28 of the functional region 25. To account for a change in refractive index, the output intensities $P_1, P_2$ can be described as:

$$P_1 = P_{10}\sin^2\left(\frac{\pi(n_0 + \Delta n)L}{\lambda}\right)$$

$$P_2 = P_{10}\cos^2\left(\frac{\pi(n_0 + \Delta n)L}{\lambda}\right)$$

where Δn is the effective refractive index difference in respective waveguide arms 30, 40. The index change can occur in only one arm or in a combination of the two arms in a push-pull configuration where one index increases while the other decreases. It should be noted that, to achieve push-pull operation, the polarity of the electric field in one of the function portions 26, 28 needs to be inverted relative to the electric field used to pole the selected functional portion 26, 28.

Where the output intensities $P_1$, $P_2$ are expressed as a function of the effective refractive index difference in the respective waveguide arms 30, 40, the equations reveal that light will cross over from the output port at $P_1$ to the output port at $P_2$, if the term within the sine and cosine expressions are an even multiple of $\pi/2$. Similarly, light will remain at the output port at $P_1$ if the term is an odd multiple of $\pi/2$. This relationship, and the fact that the TM and TE polarizations see a different electrooptically-induced refractive index, can be used to form a polarization splitter and a polarization switch. Specifically, according to one embodiment of the present invention, a polarization splitter is realized by using the electrooptic effect to adjust the refractive indices of the TE and TM polarizations separately so that one polarization will cross over from the first output port at $P_1$ to the second output port at $P_2$ and the other will remain in the same channel. A polarization switch is realized by varying at least one of the electric fields imposed across the functional region 25 to selectively control which polarization crosses over from the first output port to the second output port and which polarization remains.

The resulting outputs at ports $P_1$ and $P_2$ may be referred to as "enhanced" TE or TM signals because the optical signal strength of a polarization mode at one or both of the respective ports $P_1$ and $P_2$ is greater than the optical signal strength of the corresponding mode in the input signal at $P_{10}$. It is contemplated that present invention will also have utility where less than the entire portion of a TE or TM mode is effectively switched from one channel to the other. Specifically, the electrooptic effect may be utilized to adjust the refractive indices of the TE and TM polarizations separately so that a substantial portion, but less than all, of one polarization will cross over from the first output port at $P_1$ to the second output port at $P_2$. The resulting output signal at $P_2$ will thus comprise a signal that is enhanced with respect to a selected mode of polarization. The output signal at $P_2$ will also comprise a component in the opposite polarization but this portion of the signal may be removed through use of a polarization filter or another suitable means.

The degree to which a waveguide with a functional cladding may be subject to electrooptic control depends on the orientation and magnitude of the electric field used to drive the functional region and the strength of the electrooptic properties of the functional material. In addition, for waveguides with poled functional claddings, electrooptic control is dependent upon the orientation and magnitude of the electric field used to pole the functional region 25. As a first approximation, assume that a poling electric field in the first waveguide arm 30 produces an electrooptic coefficient along a contour such that the TE polarized light in the first waveguide arm 30 sees an electrooptic coefficient $r_{PP1}$, and the TM polarized light sees the electrooptic coefficient $r_{1P1}$. Furthermore, assume that a poling field in the second waveguide arm 40 produces an electrooptic coefficient along a contour such that the TM polarized light in the second waveguide arm 40 sees $r_{PP2}$ and the TM polarized light sees $r_{1P2}$. Also assume, in general, that $r_{1P}=r_{PP}/3$, which is a common relationship between electrooptic coefficients for polarizations parallel to the poling field ($r_{PP}$) and perpendicular to the poling field ($r_{1P}$). The electric fields $E_1$, $E_2$ produced by the coplanar electrodes can be roughly approximated as $$E_1 = \frac{V_1}{g_1} \text{ and } E_2 = \frac{V_2}{g_2}$$

where $V_1$ and $V_2$ are the voltages applied to the electrodes and $g_1$ and $g_2$ are the gaps of the coplanar electrodes in the first waveguide arm 30 and the second waveguide arm 40, respectively.

For the two waveguide core positions described in this example, the difference in refractive index in the two arms 30, 40, as seen by the TE and TM polarized light can be approximated as:

$$\Delta n_{TE} = \Delta n_1 - \Delta n_2 = \frac{1}{2} n_{TE_0}^3 \left[ \frac{r_{PP_1} V_1}{g_1} - \frac{r_{1P_2} V_2}{g_2} \right] (FCF)$$

$$\Delta n_{TM} = \Delta n_1 - \Delta n_2 = \frac{1}{2} n_{TM_0}^3 \left[ \frac{r_{1P_1} V_1}{g_1} - \frac{r_{PP_2} V_2}{g_2} \right] (FCF)$$

where, $n_{TE_o}$ and $n_{TM_o}$ are the effective refractive indices of the waveguide arms 30, 40, $r_{PP1}$ and $r_{PP2}$ are the primary electrooptic coefficients for the functional material in the first and second arms 30, 40, respectively, and FCF is a functional cladding factor that accounts for the fact that the effective index of the waveguide is only somewhat dependent on the index of the functional cladding.

It is contemplated that a suitable FCF will fall between about 0.1 and about 0.5 but may take on values outside of this range. As stated earlier, the functional cladding factor depends on the refractive index of the core and cladding material and the geometry of the waveguide. If the waveguide core 12 is also made of an electrooptic material, FCF would be about 1. It should be noted that the orientation of the $r_{PP}$ coefficient is different for the two arms 30, 40—the first arm 30 having a horizontal orientation and the second arm 40 having a vertical orientation. It should also be noted that, since the magnitude of $r_{PP}$ is dependent of the magnitude of the poling field, each arm could have a different poling field and thus a different electrooptic coefficient. For the examples below, however, $r_{PP1}=r_{PP2}$. It should also be noted that to achieve push-pull operation, one of the sets of control electrodes must be driven to generate an electric field that is opposite to the poling electric field while the other set of control electrodes must be driven to generate an electric field that is in the same direction as the poling field. This push-pull arrangement will lower the refractive index in one arm and raise the index in the other arm.

Using the expressions above, the output of the integrated optical device 20 can be calculated and graphed. FIG. 4 illustrates the operational characteristics of one specific voltage controlled polarization splitter/switch according to the present invention. It is considered a splitter because it has the ability to split the TE and TM polarizations. It is also considered a switch since the polarization splitting can be switched with voltage. For this example, the length L of the arms 30, 40 is 2 cm and the electrooptic coefficient $r_{PP}$ was 30 pm/V. The voltage $V_2$ applied across the second set of control electrodes 42 was fixed at −12.3 volts and the voltage $V_1$ applied across the first set of control electrodes 32 is varied from 0 to 100 volts. The FCF was set to 0.25 (i.e. a change in cladding index of $\Delta n$ will change the effective index of the waveguide by 0.25 $\Delta n$).

In this example, if $V_1$ is set to 22 volts, the TM component of the input light will come out of the first output port at $P_1$ and the TE component will come out of the second output port at $P_2$. If $V_1$ is set to 60 Volts, both polarizations will be split equally out both ports. If $V_1$ is set to 98 volts, the TM component of the input light will be output at $P_2$ and the TE component will be output at $P_1$.

Figure 5A:
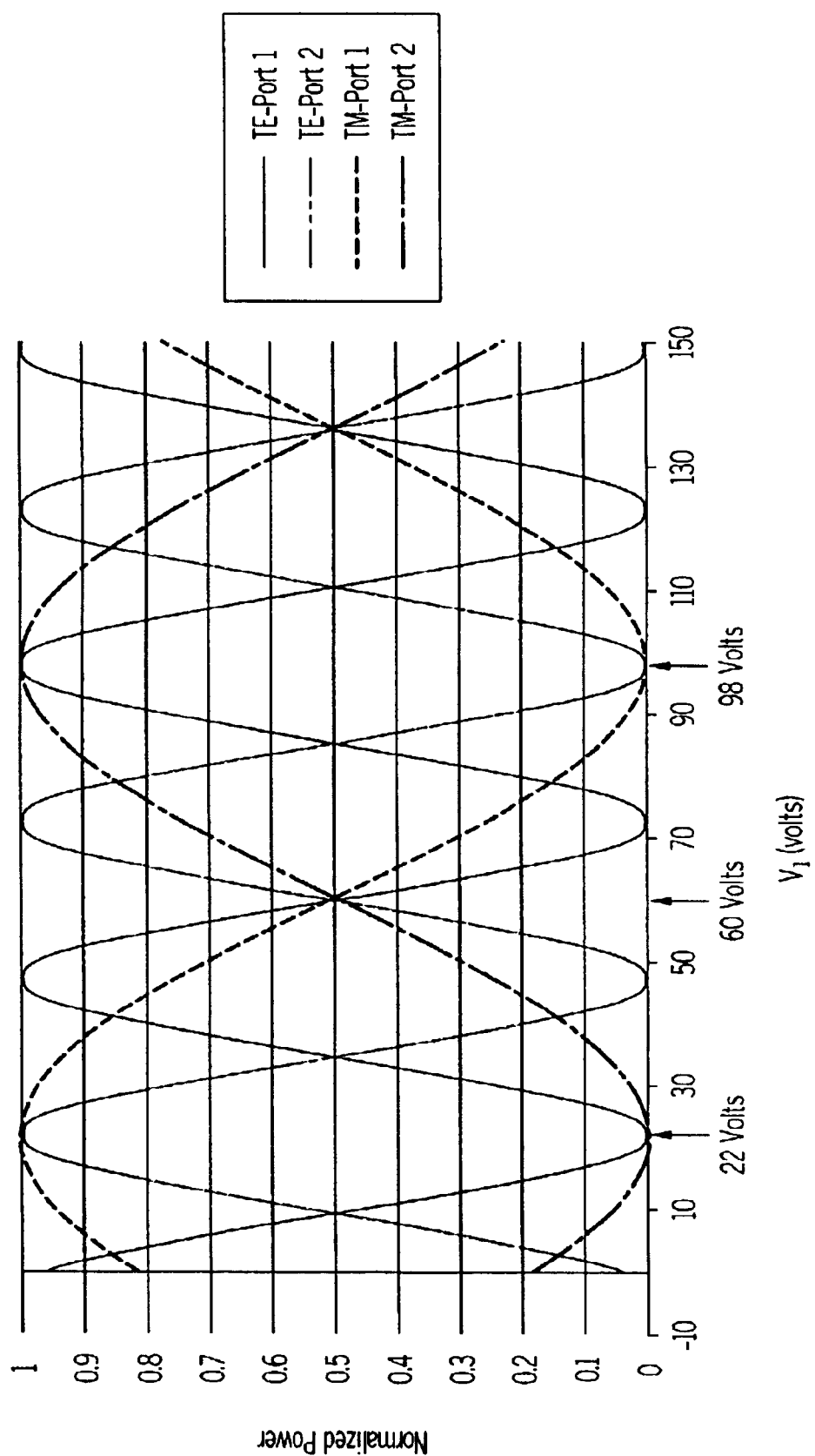
FIG. 5A illustrates the operational characteristics of one specific voltage controlled polarization splitter/switch according to the present invention.
Figure 5B:
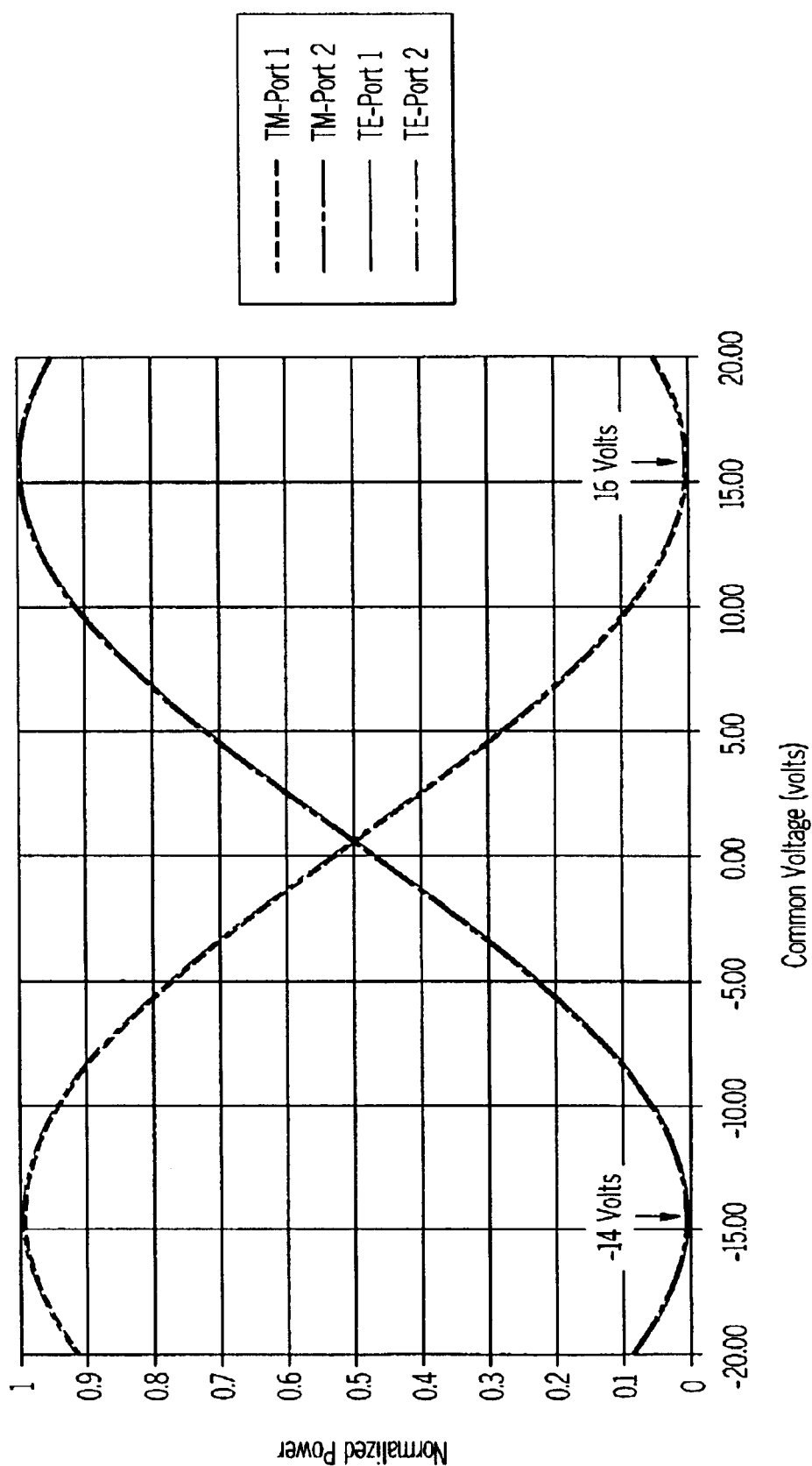
FIG. 5B is a graph illustrating the calculated response of a polarization splitter/switch as a function of common voltage applied to both sets of control electrodes of an optical device according to the present invention.

Referring to FIG. 5, an alternative to keeping one voltage fixed is to vary each voltage to the appropriate value. In this example, the length L is 2.5 cm, and the electrooptic coefficient $r_{pp}$ is 30 pm/V. An offset voltage of −1.4 volts is applied to one of the sets of electrodes 32, 42 and a common voltage is applied to both sets of electrodes 32, 42. FIG. 5 shows the calculated response. If a common voltage of −14 volts is applied to both sets of electrodes 32, 43 TE polarized light will be output at $P_2$ and TM will be output at $P_1$. If the common voltage is changed to +16 volts, the TE component will be output at $P_1$ and the TM component will be output at $P_2$.

Figure 6:
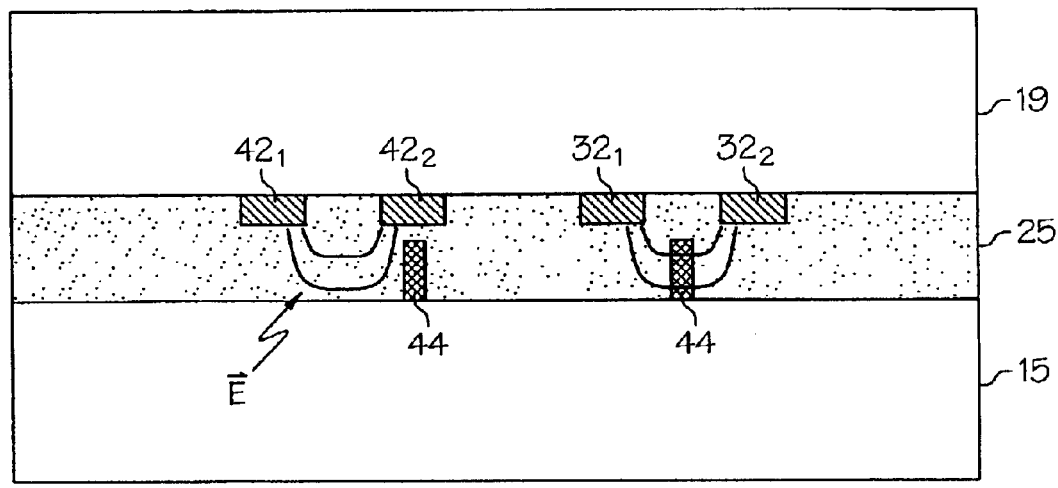
FIG. 6 illustrates relative positioning of control electrodes and waveguide cores for an optical device according to the present invention.

Regarding the push-pull mode of operation noted above, assume that the functional material that serves as the cladding 14 on the silica slab 15 has an electrooptic coefficient of 30 pm/V in the functional material when a voltage of 1000 volts is applied across a 15 micron electrode gap. FIG. 6 shows the relative positioning of the electrodes 32, 42 (listed more particularly as $32_1$, $32_2$, $42_1$, and $42_2$) and the waveguide cores 34, 44. The following table illustrates four different cases of suitable voltage configurations for a polarization splitter/switch according to the present invention. It is contemplated, of course, that a variety of additional suitable voltage configurations will fall within the scope of the present invention.

| Case | | Electrodes | | | | $P_1$ | $P_2$ |
|------|--|------|------|------|------|----|----|
|      |  | $32_1$ | $32_2$ | $42_1$ | $42_2$ | | |
| A | Drive | 16 | Ground | Ground | 14.6 | TE | TM |
| B | Voltages | −14 | Ground | Ground | −15.4 | TM | TE |
| C |  | 16 | Ground | −14.6 | Ground | TE | TM |
| D |  | −14 | Ground | 15.4 | Ground | TM | TE |

Variable Optical Attenuator

Figure 7:
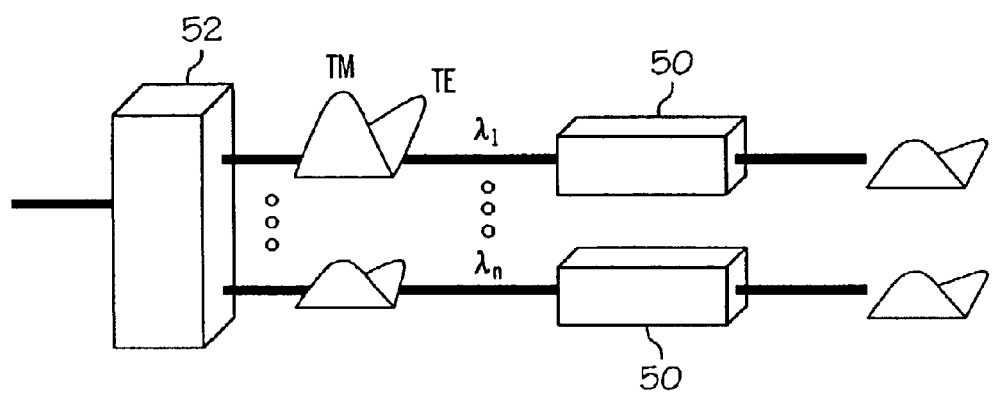
FIG. 7 is a schematic illustration of a multiple wavelength optical system incorporating variable optical attenuators.

Referring to FIG. 7, variable optical attenuators (VOAs) 50 are used in fiber-optic telecommunications, and elsewhere, to apply a variable amount of attenuation to an optical signal. They are well suited for use with demultiplexing circuits 52 to level the power of respective optical signals at all of the wavelengths in a multiple wavelength system, as shown schematically in FIG. 7. As with most fiber optic components, the input polarization is unknown and fluctuates. Therefore, it is important to have a variable optical attenuator with low polarization-dependent loss (PDL).

Figure 8:
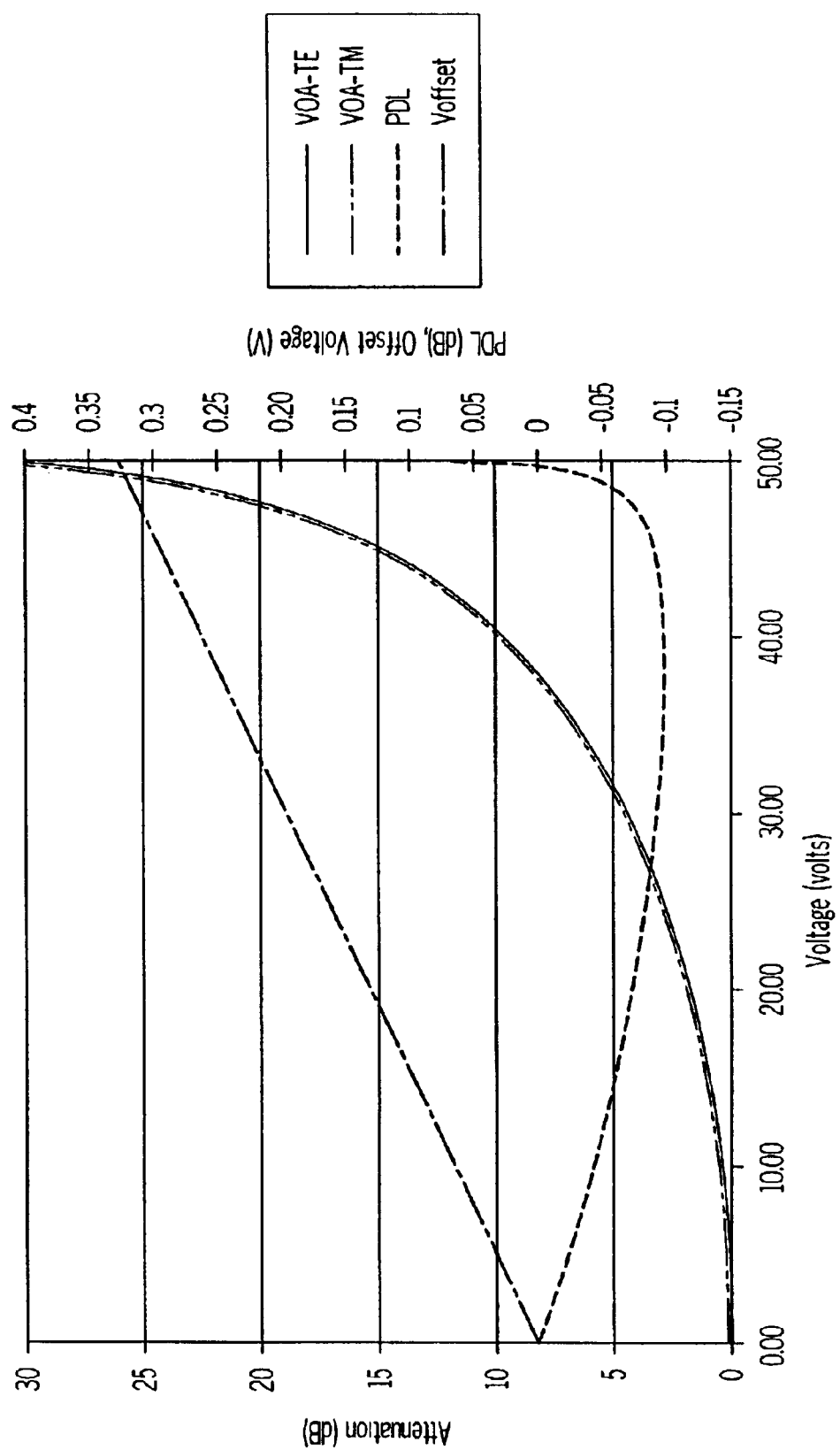
FIG. 8 is a graph illustrating polarization dependent loss as a function of attenuation for a typical thermooptic waveguide variable optical attenuator.

Integrated optical devices are often used to make VOAs. Such waveguide devices are often based upon a Mach-Zehnder interferometer configuration and may use the thermooptic, electrooptic, or other similar effect to alter the refractive index of one or both of the waveguide arms of the device. For most VOAs, PDL increases with increased attenuation. FIG. 8 shows a graph of PDL as a function of attenuation for a typical thermooptic waveguide VOA. The graph shows that the PDL increases with attenuation. Electrooptic waveguides exhibit similar PDL.

Waveguides with electrooptic cladding materials can be configured to eliminate attenuation-dependent PDL. Referring to the integrated optical device of FIGS. 3A and 3B, to operate the device 20 as a VOA, the signal output at $P_1$ would be used as the VOA output and the signal output at $P_2$ would be ignored. Since one arm of the interferometer predominately controls the TM polarization and the other arm predominately controls the TE polarization, the applied voltages can be configured to eliminate PDL.

Using the equations presented above in reference to FIGS. 3A and 3B, the signal output at $P_1$ can be calculated as a function of applied voltage, $V_1$ and $V_2$ on the first and second sets of control electrodes 32, 42. FIG. 8 shows the calculated response of a VOA as a function of voltage. A small offset voltage is applied to one of the sets of control electrodes 32, 42 to compensate for the attenuation-dependent PDL. In this example, $V_2 = V_1 - V_{offset}$. The following table summarizes several points on the graph of FIG. 8:

| $V_1$ | $V_{offset}$ | $V_2$ | VOA-TE | VOA-TM | PDL |
|-------|--------------|-------|--------|--------|-----|
| 31.71 volts | 0.21 volts | 31.5 volts | 5.04 dB | 5.13 dB | 0.095 dB |
| 40.77 volts | 0.27 volts | 40.5 volts | 10.26 dB | 10.36 dB | 0.1 dB |
| 45 volts | 0.3 volts | 44.7 volts | 14.92 dB | 15.01 dB | 0.09 dB |

Polarization Delay Controller.

A waveguide device configured to utilize the electrooptic effect is inherently polarization dependent. More specifically, either the TE polarized light or the TM polarized will be more affected by the change in refractive index resulting from the electrooptic effect. The change in delay down a length of waveguide, L, is given by:

$$\Delta \text{delay} = \frac{L \Delta n}{c}$$

where $\Delta n$ is the change in the effective index (TE and TM polarizations).

A 2.5 cm functionally-clad waveguide can only provide limited differential phase shift. To achieve additional differential delay between two polarizations, the TE and TM polarizations of an optical signal may be split and subsequently directed through a separate delay paths. According to an additional embodiment of the present invention, the polarization splitter/switch described above with reference to FIGS. 3A and 3B is combined with a polarization-dependent phase shifter.

Figure 9:
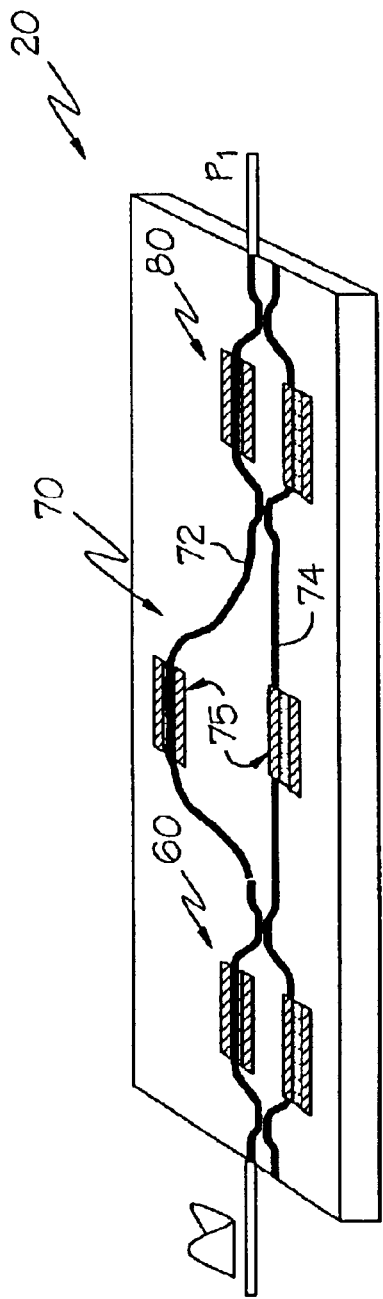
FIG. 9 is a schematic representation of an integrated optical device configured to control polarization delay.

FIG. 9 is a schematic representation of an integrated optical device 20 configured to control polarization delay by combining a polarization splitter/switch 60 and a polarization-dependent phase shifter 70. The structure and operation of the polarization splitter/switch 60 is described above with reference to FIGS. 3A and 3B. The polarization-dependent phase shifter 70 introduces a delay in one of the polarization modes by introducing a longer optical path length in one of the optical waveguide arms 72, 74 of the phase shifter 70, introducing a relative difference in refractive index of the waveguide arms 72, 74, or both (as is illustrated in FIG. 9).

If the polarization splitter 60 is set to send the TE portion of the optical signal through an optical waveguide arm having a longer path length, then the difference in phase shift through the device 20 is given by:

$$\Delta \text{delay}_{TE} = \frac{\Delta L n_{TE} + L \Delta n_{TE}}{c}$$

$$\Delta \text{delay}_{TM} = \frac{L \Delta n_{TM}}{c}$$

where $\Delta L$ is the difference in the lengths of the optical path in the phase shifter 70 and L is the length of the functionally active region 75 of the phase shifter 70. Clearly, if the state of polarization splitter is switched, the TM light will experience the additional length.

A polarization combiner 80 recombines the polarizations split by the polarization splitter and outputs the recombined signal at $P_1$. It is important to note that the two polarizations will not interfere at the input of the polarization combiner 80. In other words, the phase shifter 70 does not operate as an interferometer; simply as two independent delay lines. The state of the polarization combiner 80 should be set to the same state as the polarization splitter 60 in order for both of the polarizations to be output at $P_1$. If the polarization splitter 60 is configured to keep the TE portion of the input signal in the first arm 72 and cross over the TM portion of the signal to the second arm 74, then the polarization combiner 80 should do the same.

Figure 10:
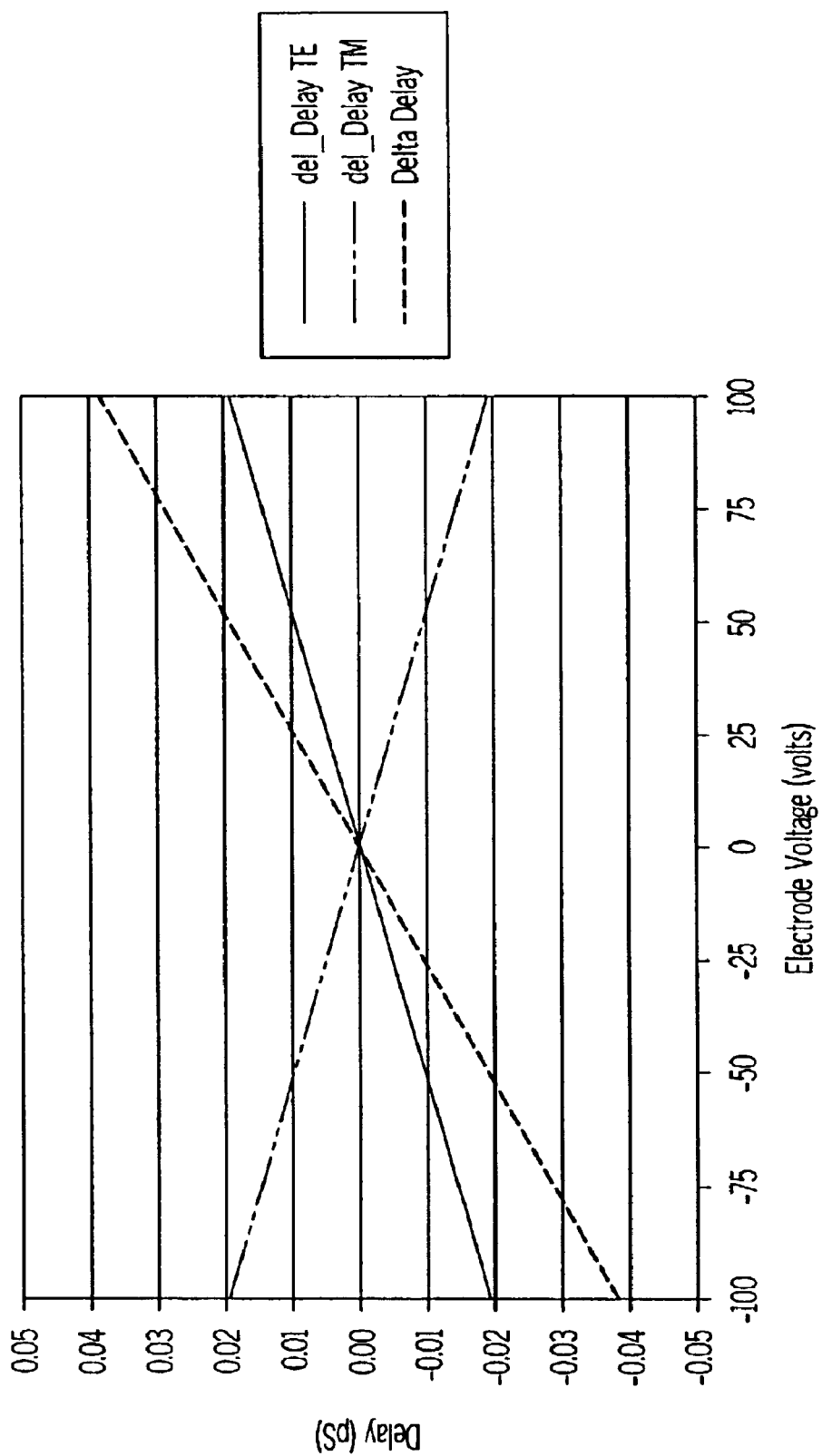
FIG. 10 is a graph illustrating the calculated relationship between change in delay for the TE signal, the TM signal and the difference between the two.

If the delay lines 72, 74 in the phase shifter 70 define equal path lengths, then a difference in delay for the TE and TM portions of the optical signal is introduced by introducing a relative difference in refractive index of the waveguide arms 72, 74 in the functional region 75. This may be accomplished by changing the refractive index in one or both arms 72, 74. Assume, for example, that the first and second sets of control electrodes 76, 78 associated with each arm 72, 74 are configured to optimize index change for a given polarization (TE or TM, depending on which delay line). The electrodes 76, 78 can be configured so that a positive voltage will retard the TE polarization (i.e. increase the index in the TE path) and advance the TM polarization (i.e. reduce the index in the TM path) and a negative voltage will do the opposite (retard the TM and advance the TE). FIG. 10 shows the calculated relationship between change in delay for the TE signal, the TM signal and the difference between the two. As the voltage is changes from −100 to 100 volts, the difference in delay (denoted as Delta Delay on graph) changes from about −0.04 pS to 0.04 pS.

If the delay lines defined by the waveguide arms 72, 74 are different in length, then a fixed delay is inserted in one of the signals. Consider, for example, that the TE path is longer than the TM path by a length ΔL. Assuming that the electrooptic portion of each path is still fixed at L, the difference in delay can be increased by an amount given by:

$$\Delta delay = \frac{\Delta L \cdot n}{c}$$

Figure 11:
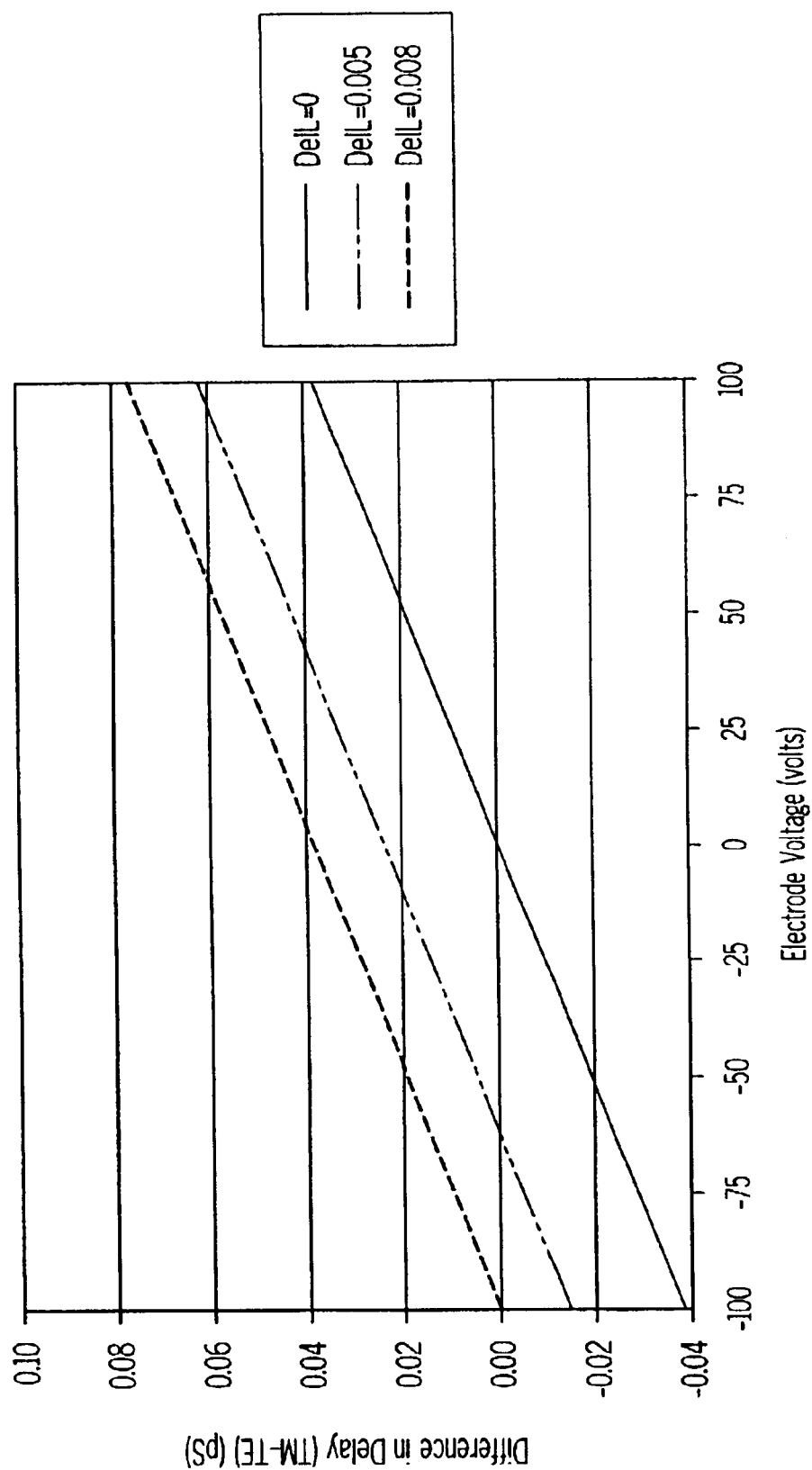
FIG. 11 is a graph illustrating examples of delays as a function of voltage for several different fixed length differences.
Figure 13E:
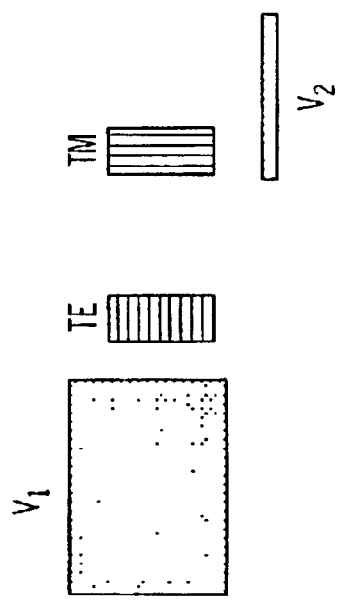
Figure 13G:
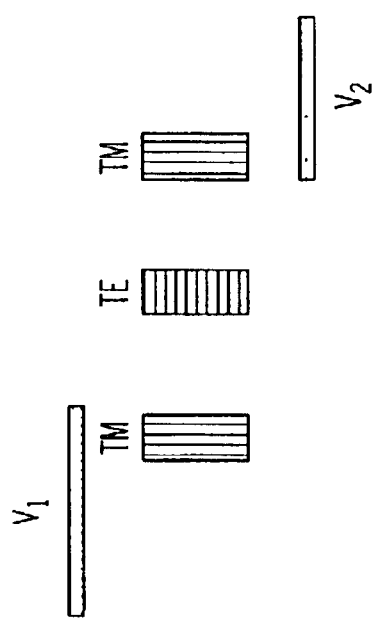
Figure 13F:
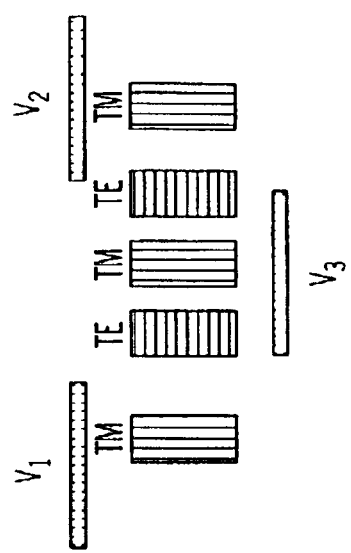
Figure 13H:
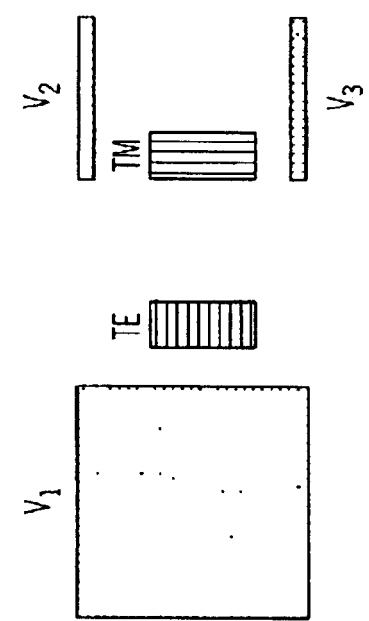

FIG. 11 shows examples of delays as a function of voltage for several different fixed length differences (denoted as DelL in the graph).

Polarization Converter.

Figure 12:
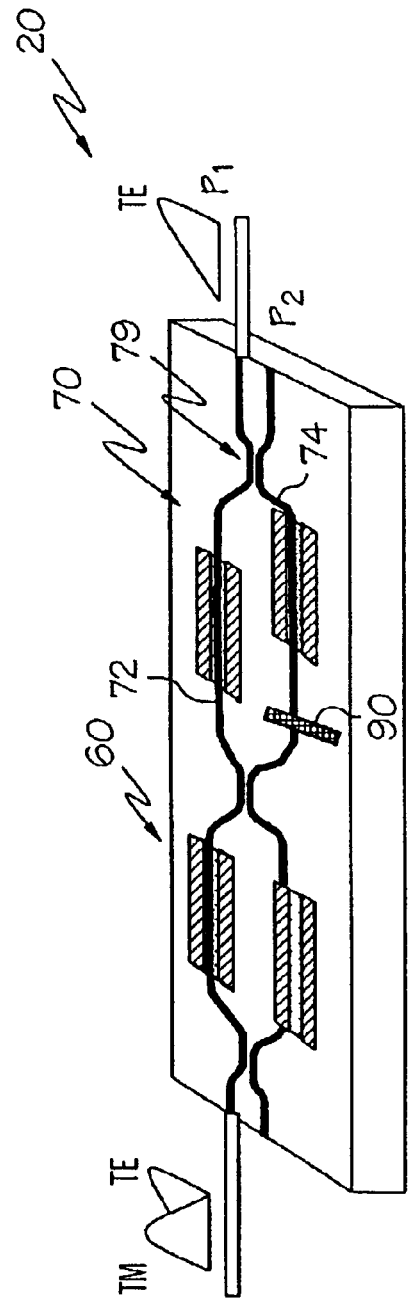
FIG. 12 is schematic illustration of an integrated optical device according to one embodiment of the present invention.

It is often desirable to convert an optical signal with unknown polarization to a known polarization. One concept for doing this is illustrated in FIG. 12. In the integrated optical device 20 of FIG. 12, a polarization splitter 60, as described previously, splits an optical signal into its two primary components of polarization (i.e., the TE and TM polarization modes) and directs the split signals into separate delay lines defined by waveguide arms 72, 74 of a phase shifter 70. A half-wave plate 90 is used in one of the waveguide arms 72, 74 to rotate the polarization state by 90 degrees (e.g. from TM to TE or TE or TM). The half-wave plate described in this concept is assumed to be a drop-in filter that is inserted into a groove in the silica waveguide device. Typically, a 20 μm groove is cut perpendicular to the channel waveguide. A half-wave plate is then inserted and epoxied into place.

Following rotation, both delay lines of the waveguide arms 72, 74 contain light of a common polarization and can interfere. Therefore, an electrooptic phase shifter is needed to set the initial state of the output coupler 79 of the phase shifter 70 so an unattenuated optical signal may be output at $P_1$. It is contemplated that the electrooptic control in the delay lines 72, 74 can also be used attenuate the output signal by directing some of the light to the unconnected output port at $P_2$. It will be appreciated that the state of the polarization switch may be configured to direct either TM or TE polarized light to the output port at $P_1$ because the half-wave plate can convert either TE polarized light to TM polarized light or TM polarized light to TE polarized light.

Referring now to FIGS. 13A–13H, although the present invention has been described herein with primary reference to the electrode/core configurations of FIGS. 1A and 1B, it is noted that a variety of additional electrode/core configurations will fall within the scope of the present invention. By way of example, and not by way of limitation, FIGS. 13A–13H illustrate a variety of suitable electrode/core configurations where the electrodes are indicated generally as $V_1$, $V_2$, and $V_3$ and the optical waveguide cores are denoted by reference to the predominate mode of polarization to be affected by the particular core position. Each of the figures includes at least one example of a core position suitable for affecting the two different primary modes of polarization of an optical signal in a waveguide.

Figure 14:
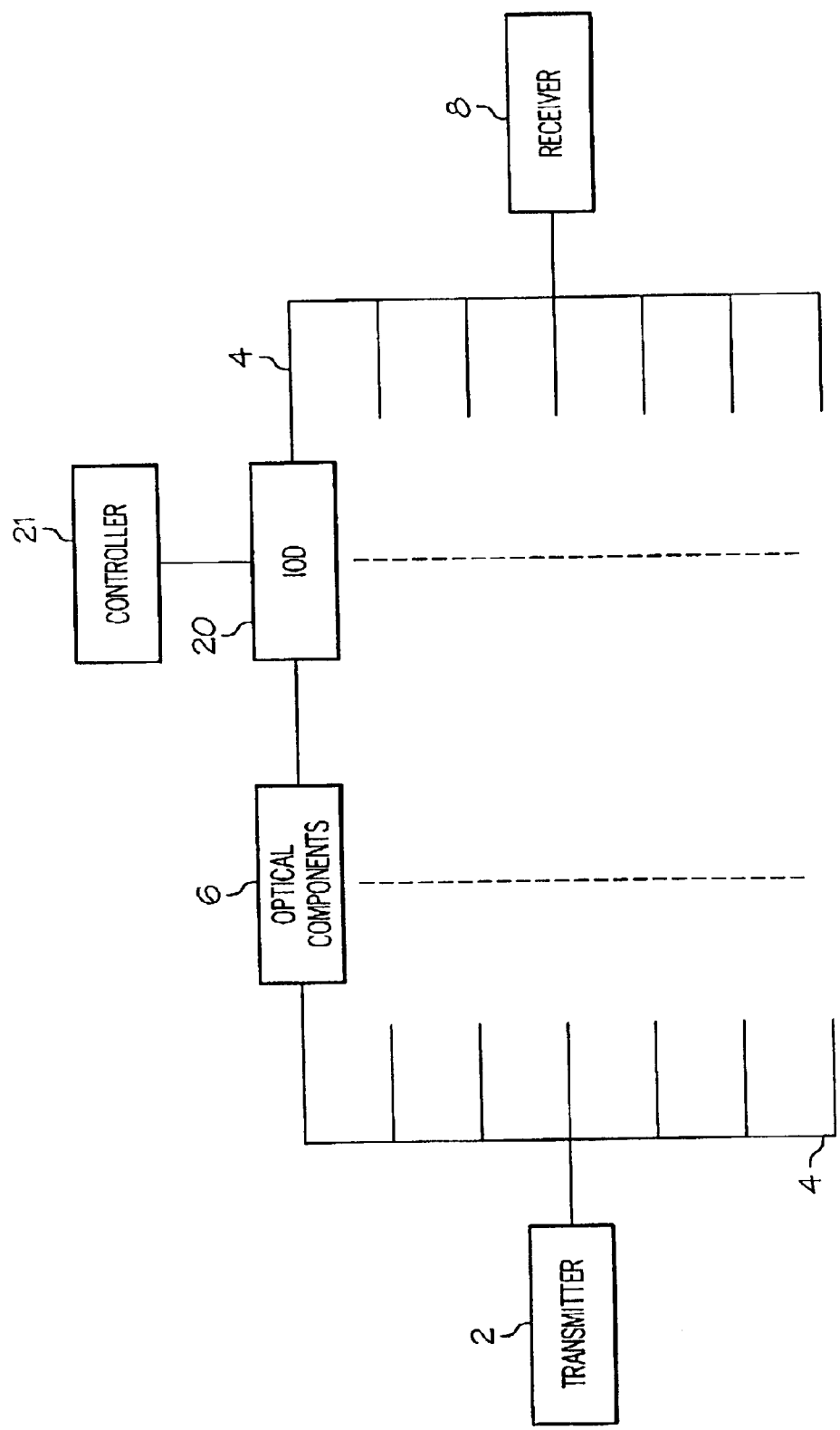
FIG. 14 is an illustration of an optical network according to the present invention.

Referring to FIG. 14, it is noted that integrated optical devices according to the present invention may be employed in a telecommunications or other type of optical network 5. An optical network 5 according to the present invention may comprise, among other things, one or more transmitters 2, a network of optical transmission lines 4, a variety of optical components 6, one or more integrated optical devices 20 according to the present invention, and one or more receivers 8. The network may further comprise electrical or other non-optical components and transmission lines (not shown). The optical transmitter 2 is configured to transmit an optical signal characterized by a plurality of different modes of polarization, e.g., the TE and TM polarization modes. The variety of optical components commonly utilized in an optical network are illustrated herein with reference to a single block element to preserve clarity of illustration and may include, for example, optical switches, amplifiers, couplers, regenerators, filters, etc.

One or more of the optical components 6 may introduce polarization dependent phase delays in the optical signals propagating through the optical network 5. Integrated optical devices 20 of the present invention may be configured as a polarization dependent phase shifter, as is illustrated in FIGS. 1A and 1B, for example, to correct for the polarization dependent phase delays introduced by one or more of the optical components 6. More specifically, and by way of example, where an input optical signal is characterized by a phase difference between the TM and TE modes of the optical signal, an integrated optical device 20 may comprise a polarization dependent phase shifter 10 configured and controlled by controller 21 to alter the phase of TE oriented light more than TM oriented light, or vice-versa, as is illustrated in FIGS. 1A and 1B.

The controller 21 may be programmed to compensate for the polarization dependent phase delay on a fully automated basis or in response to an operator command. The operator command may comprise a simple "compensate" command directed at initiating a compensation operation or may, for example, represent input of an actual quantification of the polarization dependent phase delay introduced by the optical component.

Several embodiments of the present invention described herein are directed to affecting refractive index using functional electrooptic claddings. However, it is contemplated that many of the embodiments described herein are also applicable for functional electrooptic waveguide cores—with or without functional claddings.

Some embodiments of the present invention have been illustrated with reference to functional regions including poled electrooptic portions. However, it is noted that the concepts of the present invention are equally applicable to devices where the electrooptic portions of the functional regions are not characterized by a predetermined poling.

For the purposes of defining and describing the invention, it is noted that reference to directional coupling regions near an input or output side of the device merely refers generally to the relative locations of the regions on the device and does not require that the regions are defined at the input or output face of the device. Rather, the regions merely need be arranged in different portions of the device, where one portion may be characterized as near the input side of the device and the other portion may be defined as near the output side of the device.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. An integrated optical device comprising (i) first and second optical waveguide arms arranged to define an optical signal splitting region near an input side of said integrated optical device and an optical signal combining region near an output side of said integrated optical device and (ii) a functional region between said optical signal splitting and combining regions, wherein:

said first optical waveguide arm comprises a first waveguide core passing through a first electrooptic portion of said functional region, said first waveguide core being optically non-functional relative to a remaining portion of said functional region;

said second optical waveguide arm comprises a second waveguide core passing through a second electrooptic portion of said functional region, said second waveguide core being optically non-functional relative to a remaining portion of said functional region;

a first set of control electrodes are positioned to generate an electric field in said first portion of said functional region;

a second set of control electrodes are positioned to generate an electric field in said second portion of said functional region;

said first set of control electrodes, said first waveguide core, and said first portion of said functional region are configured such that a TE electromagnetic polarization mode of an optical signal propagating along said first waveguide core encounters an electrooptically induced change in refractive index that is more predominant than an electrooptically induced change in refractive index encountered by a TM electromagnetic polarization mode of said optical signal propagating along said first waveguide core; and said second set of control electrodes, said second waveguide core, and said second portion of said functional region are configured such that a TM electromagnetic polarization mode of an optical signal propagating along said second waveguide core encounters an electrooptically induced change in refractive index that is more predominant than an electrooptically induced change in refractive index encountered by a TE electromagnetic polarization mode of said optical signal propagating along said second waveguide core.

2. An integrated optical device as claimed in claim 1 wherein said control electrodes and said waveguide core of said first portion of said functional region define a symmetric configuration and said control electrodes and said waveguide core of said second portion of said functional region define an asymmetric configuration.

3. An integrated optical device as claimed in claim 1 wherein said first and second sets of control electrodes define substantially identical configurations.

4. An integrated optical device as claimed in claim 3 wherein said second waveguide core is offset in relation to said second set of control electrodes as compared to a position of said first waveguide core in relation to said first set of control electrodes.

5. An integrated optical device as claimed in claim 3 wherein said first waveguide core is offset in relation to said first set of control electrodes as compared to a position of said second waveguide core in relation to said second set of control electrodes.

6. An integrated optical device as claimed in claim 1 wherein the predominant difference between a configuration of said first set of control electrodes and said first waveguide core and a configuration of said second set of control electrodes and said second waveguide core relates to the positioning of first and second waveguide cores relative to said first and second sets of control electrodes.

7. An integrated optical device as claimed in claim 1 wherein said first waveguide core is positioned substantially equidistant from said control electrodes of said first set of control electrodes and said second waveguide core is positioned substantially closer to one of said control electrodes of said second set of control electrodes.

8. An integrated optical device as claimed in claim 1 wherein respective control electrodes of said first and second sets of control electrodes define orientations characterized as one or more of:

comprising at least two electrodes lying in a common edge plane;

comprising three electrodes lying in a common edge plane;

defining an axis of symmetry perpendicular to a common edge plane;

comprising at least two control electrodes lying in parallel planes;

comprising at least one control electrode is limited to extend for a majority of its width along one side of said core in one of said parallel planes;

comprising one control electrode limited to extend for a majority of its width along one side of said core in one of said parallel planes another of said control electrodes limited to extend for a majority of its width along another side of said core in another of said parallel planes;

comprising at least two control electrodes lying in a common edge plane and a third control electrode lying in a plane parallel to said common edge plane;

comprising electrodes define substantially equal thicknesses;

comprising at least two control electrodes lying in a common edge plane and a third control electrode lying in a plane parallel to said common edge plane, wherein said third electrode extends to one side of said waveguide core for a majority of its width along said parallel plane.

9. An integrated optical device as claimed in claim 1 wherein respective ones of said first and second cores define orientations characterized as one or more of:

offset from an axis of symmetry of said control electrodes;

offset from a common edge plane of said control electrodes;

offset from an axis of symmetry of said control electrodes and from a common edge plane of said control electrodes;

lying between a common edge plane of said control electrodes and a plane offset from said common edge plane;

positioned between parallel planes defined by said control electrodes;

positioned between parallel planes defined by said control electrodes, unequal distances from said control electrodes;

positioned unequal distances from said control electrodes;

positioned unequal distances from two of said control electrodes lying in a common edge plane;

lying between said common edge plane and said parallel plane;

positioned unequal distances from at least two of said control electrodes; and positioned unequal distances from at least three of said control electrodes.

10. An integrated optical device as claimed in claim 1 wherein said integrated optical device comprises a planar lightwave circuit.

11. An integrated optical device as claimed in claim 1 wherein each of said waveguide arms define respective input ports on said input side of said optical device and respective output ports on said output side of said optical device.

12. An integrated optical device as claimed in claim 1 wherein said optical signal splitter is selected from a 2×2 directional coupling region, a 1×2 directional coupling region, a 1×2 Y signal splitter, a 1×2 multimode interference element splitter, and a 2×2 multimode interference element splitter.

13. An integrated optical device as claimed in claim 1 wherein said optical signal combiner is selected from a 2×2 directional coupling region, a 1×2 directional coupling region, a 1×2 Y signal combiner, a 1×2 multimode interference element combiner, and a 2×2 multimode interference element combiner.

14. An integrated optical device as claimed in claim 1 wherein said first optical waveguide arm comprises a first electrooptically clad waveguide core in said first portion of said functional region.

15. An integrated optical device as claimed in claim 1 wherein said second optical waveguide arm comprises a second electrooptically clad waveguide core in said second portion of said functional region.

16. An integrated optical device as claimed in claim 1 wherein said control electrodes and said waveguide core of at least one of said first and second portions of said functional region define an asymmetric configuration.

17. An integrated optical device as claimed in claim 1 wherein said functional region is characterized by a predetermined poling.

18. An integrated optical device configured for splitting TE and TM modes of an optical signal, said device comprising (i) first and second optical waveguide arms arranged to define an optical signal splitting region near an input side of said integrated optical device and an optical signal combining region near an output side of said integrated optical device, (ii) a functional region between said optical signal splitting and combining regions, and (iii) a controller coupled functional region, wherein:

said first optical waveguide arm comprises a first waveguide core passing through a first electrooptic portion of said functional region;

said second optical waveguide arm comprises a second waveguide core passing through a second electrooptic portion of said functional region;

a first set of control electrodes are positioned to generate an electric field in said first portion of said functional region;

a second set of control electrodes are positioned to generate an electric field in said second portion of said functional region;

said first set of control electrodes, said first waveguide core, and said first portion of said functional region are configured such that, upon application of suitable voltage to said first set of control electrodes, as established by said controller, a TE electromagnetic polarization mode of an optical signal propagating along said first waveguide core encounters an electrooptically induced change in refractive index that is more predominant than an electrooptically induced change in refractive index encountered by a TM electromagnetic polarization mode of said optical signal propagating along said first waveguide core;

said second set of control electrodes, said second waveguide core, and said second portion of said functional region are configured such that, upon application of suitable voltage to said second set of control electrodes, as established by said controller, a TM electromagnetic polarization mode of an optical signal propagating along said second waveguide core encounters an electrooptically induced change in refractive index that is more predominant than an electrooptically induced change in refractive index encountered by a TE electromagnetic polarization mode of said optical signal propagating along said second waveguide core; and said controller is programmed to establish said voltages applied to said first and second sets of control electrodes to affect optical coupling at said optical signal combining region of TE and TM polarized portions of said optical signals propagating along said first and second waveguide cores such that one of said first and second waveguide cores following said optical signal combining region includes an enhanced TE signal while the other of said first and second waveguide cores following said optical signal combining region includes an enhanced TM signal.

19. An integrated optical device as claimed in claim 18 wherein said controller is programmed to establish said voltages such that:
- a TE component of an optical signal propagating along said first waveguide core crosses over to said second waveguide core at said optical signal combining region while a TM component of said optical signal propagating along said first waveguide core remains in said first waveguide core; and
- a TM component of an optical signal propagating along said second waveguide core crosses over to said first waveguide core at said optical signal combining region while a TE component of said optical signal propagating along said second waveguide core remains in said second waveguide core.

20. An integrated optical device as claimed in claim 18 wherein said controller is programmed to establish said voltages such that:
- a TM component of an optical signal propagating along said first waveguide core crosses over to said second waveguide core at said optical signal combining region while a TM component of said optical signal propagating along said first waveguide core remains in said first waveguide core; and
- a TE component of an optical signal propagating along said second waveguide core crosses over to said first waveguide core at said optical signal combining region while a TM component of said optical signal propagating along said second waveguide core remains in said second waveguide core.

21. An integrated optical device as claimed in claim 18 wherein said controller is programmed to establish said voltages such that one of said first and second waveguide cores following said optical signal combining region includes substantially all TE polarized portions of said signals while the other of said first and second waveguide cores following said optical signal combining region includes substantially all TM polarized portions of said signals.

22. An integrated optical device as claimed in claim 18 wherein said controller is programmed to establish said voltages by (i) varying the voltages applied to both the first and second sets of control electrodes or by (ii) maintaining the voltage applied to one of the first and second sets of control electrodes while varying the voltage applied to the other of the first and second sets of control electrodes.

23. An integrated optical device as claimed in claim 18 wherein said first and second functional portions of said functional region are characterized by a predetermined poling and wherein said controller is programmed to establish said voltages such that a polarity of a voltage applied to one of said first and second sets of control electrodes is opposite said predetermined poling.

24. An integrated optical device as claimed in claim 18 wherein said controller is programmed to establish said voltages in response to an input at a user interface coupled to said controller.

25. An integrated optical device as claimed in claim 18 wherein said controller is programmed to establish said voltages in response to operating parameters stored in memory accessible by said controller.

26. An integrated optical device as claimed in claim 18 wherein said functional region is characterized by a predetermined poling.

27. A method of operating an integrated optical device configured for splitting TE and TM modes of an optical signal, said device comprising (i) first and second optical waveguide arms arranged to define an optical signal splitting region near an input side of said integrated optical device and an optical signal combining region near an output side of said integrated optical device, (ii) a functional region between said optical signal splitting and combining regions, and (iii) a controller coupled to said functional region, wherein said first optical waveguide arm comprises a first waveguide core passing through a first electrooptic portion of said functional region, said second optical waveguide arm comprises a second waveguide core passing through second electrooptic portion of said functional region, a first set of control electrodes are positioned to generate an electric field in said first portion of said functional region, and a second set of control electrodes are positioned to generate an electric field in said second portion of said functional region, said method comprising:
- applying a suitable voltage to said first set of control electrodes, as established by said controller, such that a TE electromagnetic polarization mode of an optical signal propagating along said first waveguide core encounters an electrooptically induced change in refractive index that is more predominant than an electrooptically induced change in refractive index encountered by a TM electromagnetic polarization mode of said optical signal propagating along said first waveguide core;
- applying a suitable voltage to said second set of control electrodes, as established by said controller, such that a TM electromagnetic polarization mode of an optical signal propagating along said second waveguide core encounters an electrooptically induced change in refractive index that is more predominant than an electrooptically induced change in refractive index encountered by a TE electromagnetic polarization mode of said optical signal propagating along said second waveguide core; and
- establishing said voltages applied to said first and second sets of control electrodes to affect optical coupling at said optical signal combining region of TE and TM polarized portions of said optical signals propagating along said first and second waveguide cores such that one of said first and second waveguide cores following said optical signal combining region includes an enhanced TE signal while the other of said first and second waveguide cores following said optical signal combining region includes an enhanced TM signal.

28. A method as claimed in claim 27 wherein each of said waveguide arms define respective input ports on said input side of said optical device and respective output ports on said output side of said optical device and wherein said method of operating said device comprises:
- providing said optical signal including said TE and TM modes of polarization at one of said respective input ports;
- directing said TE polarized portions of said signals following said optical signal combining region to one of said output ports; and
- directing said TM polarized portions of said signals following said optical signal combining region to another of said output ports.

29. A method of operating an integrated optical device as claimed in claim 27 wherein said functional region is characterized by a predetermined poling.

30. An integrated optical device configured for variable optical attenuation of an optical signal including TE and TM modes of polarization, said device comprising (i) first and second optical waveguide arms arranged to define an optical signal splitting region near an input side of said integrated optical device and an optical signal combining region near an output side of said integrated optical device, (ii) a functional region between said optical signal splitting a combining regions, and (iii) a controller coupled to said functional region, wherein:

said first optical waveguide arm comprises a first waveguide core passing through a first electrooptic portion of said functional region, said first waveguide core being optically non-functional relative to a remaining portion of said functional region;

said second optical waveguide arm comprises a second waveguide core passing through a second electrooptic portion of said functional region, said second waveguide core being optically non-functional relative to a remaining portion of said functional region;

a first set of control electrodes are positioned to generate an electric field in said first portion of said functional region;

a second set of control electrodes are positioned to generate an electric field in said second portion of said functional region;

said first set of control electrodes, said first waveguide core, and said first portion of said functional region are configured such that, upon application of suitable voltage to said first set of control electrodes, as established by said controller, a TE electromagnetic polarization mode of an optical signal propagating along said first waveguide core encounters an electrooptically induced change in refractive index that is more predominant than an electrooptically induced change in refractive index encountered by a TM electromagnetic polarization mode of said optical signal propagating along said first waveguide core;

said second set of control electrodes, said second waveguide core, and said second portion of said functional region are configured such that, upon application of suitable voltage to said second set of control electrodes, as established by said controller, a TM electromagnetic polarization mode of an optical signal propagating along said second waveguide core encounters an electrooptically induced change in refractive index that is more predominant than an electrooptically induced change in refractive index encountered by a TE electromagnetic polarization mode of said optical signal propagating along said second waveguide core; and said controller is programmed to establish said voltages applied to said first and second sets of control electrodes to affect selective attenuation of TE and TM polarized portions of an optical signal coupled to an input port of a selected one of said waveguide cores on said input side of said integrated optical device, such that said TE and TM polarized portions of said optical signal are attenuated to substantially equal extents at an output port of said selected waveguide core on said output side of said integrated optical device.

31. An integrated optical device as claimed in claim 30 wherein said controller is programmed such that said selective attenuation of said TE and TM portions of said optical signal accounts for characteristic polarization dependent loss of said integrated optical device.

32. An integrated optical device as claimed in claim 31 wherein said controller is programmed to further account for an increase in said characteristic polarization dependent loss with an increase in attenuation of said optical signal in said functional region.

33. An integrated optical device as claimed in claim 30 wherein said controller is programmed such that an offset voltage, characterized by a difference between a voltage applied to said first set of control electrodes and a voltage applied to said second set of control electrodes, increases as said voltages applied to said first and second sets of control electrodes increase.

34. An integrated optical device as claimed in claim 33 wherein said offset voltage increases linearly.

35. An integrated optical device as claimed in claim 33 wherein said controller is programmed to control said offset voltage to minimize a characteristic polarization dependent loss of said integrated optical device.

36. An integrated optical device as claimed in claim 30 wherein said functional region is characterized by a predetermined poling.

37. A method of operating an integrated optical device configured for variable optical attenuation of TE and TM modes of an optical signal, said device comprising (i) first and second optical waveguide arms arranged to define an optical signal splitting region near an input side of said integrated optical device and an optical signal combining region near an output side of said integrated optical device, (ii) a functional region between said optical signal splitting a combining regions, and (iii) a controller coupled to said functional region, wherein said first optical waveguide arm comprises a first waveguide core passing through a first electrooptic portion of said functional region, said first waveguide core is optically non-functional relative to a remaining portion of said functional region, said second optical waveguide arm comprises a second waveguide core passing through a second electrooptic portion of said functional region, said second waveguide core is optically non-functional relative to a remaining portion of said functional region, a first set of control electrodes are positioned to generate an electric field in said first portion of said functional region, and a second set of control electrodes are positioned to generate an electric field in said second portion of said functional region, said method comprising:

applying a suitable voltage to said first set of control electrodes, as established by said controller, such that a TE electromagnetic polarization mode of an optical signal propagating along said first waveguide core encounters an electrooptically induced change in refractive index that is more predominant than an electrooptically induced change in refractive index encountered by a TM electromagnetic polarization mode of said optical signal propagating along said first waveguide core;

applying a suitable voltage to said second set of control electrodes, as established by said controller, such that a TM electromagnetic polarization mode of an optical signal propagating along said second waveguide core encounters an electrooptically induced change in refractive index that is more predominant than an electrooptically induced change in refractive index encountered by a TE electromagnetic polarization mode of said optical signal propagating along said second waveguide core; and establishing said voltages applied to said first and second sets of control electrodes to affect selective attenuation of TE and TM polarized portions of an optical signal coupled to an input port of a selected one of said waveguide cores on said input side of said integrated optical device, such that said TE and TM polarized portions of said optical signal are attenuated to substantially equal extents at an output port of said selected waveguide core on said output side of said integrated optical device.

38. A method as claimed in claim 37 wherein each of said waveguide arms define respective input ports on said input side of said optical device and respective output ports on said output side of said optical device and wherein said method of operating said device comprises:
providing said optical signal including said TE and TM modes of polarization at an input port of a selected one of said waveguide arms;
directing said attenuated optical signal including said selectively attenuated TE and TM polarized portions to an output of said selected waveguide arm.

39. A method of operating an integrated optical device as claimed in claim 37 wherein said functional region is characterized by a predetermined poling.

40. An integrated optical device configured to control delay in respective TE and TM modes of polarization of an optical signal, said device comprising:
a polarization splitter configured to direct a TE mode of an input optical signal to a first optical waveguide arm of said device and a TM mode of said input optical signal to a second optical waveguide arm of said device;
a polarization combiner configured to combine said TE mode of said first optical waveguide arm with said TM mode of said second optical waveguide arm into an output optical signal;
a functional region between said optical signal splitting and combining regions, wherein said first optical waveguide arm comprises a first waveguide core passing through a first electrooptic portion of said functional region, said first waveguide core is optically non-functional relative to a remaining portion of said functional region, said second optical waveguide arm comprises a second waveguide core passing through a second electrooptic portion of said functional region, said first waveguide core is optically non-functional relative to a remaining portion of said functional region, a first set of control electrodes are positioned to generate an electric field in said first portion of said functional region, and a second set of control electrodes are positioned to generate an electric field in said second portion of said functional region; and
a delay section in a propagation path between said polarization splitter and said polarization combiner, wherein said delay section is configured to affect a relative phase delay between said TE mode of polarization in said first optical waveguide arm and said TM mode of polarization in said second optical waveguide arm and said control electrodes, at least one of said waveguide cores, and at least a portion of said functional region are configured such that, upon application of suitable voltage to said control electrodes, a first electromagnetic polarization mode of an optical signal propagating along one of said waveguide cores encounters an electrooptically induced change in refractive index that is more predominant than an electrooptically induced change in refractive index encountered by an electromagnetic polarization mode perpendicular to said first polarization mode of said optical signal propagating along said waveguide core.

41. An integrated optical device as claimed in claim 40 wherein said delay section is configured to define first and second optical waveguide arms of equal path lengths.

42. An integrated optical device as claimed in claim 40 wherein:
said first set of control electrodes, said first waveguide core, and said first portion of said functional region are configured such that, upon application of suitable voltage to said first set of control electrodes, a TE electromagnetic polarization mode of an optical signal propagating along said first waveguide core encounters an electrooptically induced change in refractive index that is more predominant than an electrooptically induced change in refractive index encountered by a TM electromagnetic polarization mode of said optical signal propagating along said first waveguide core; and
said second set of control electrodes, said second waveguide core, and said second portion of said functional region are configured such that, upon application of suitable voltage to said second set of control electrodes, a TM electromagnetic polarization mode of an optical signal propagating along said second waveguide core encounters an electrooptically induced change in refractive index that is more predominant than an electrooptically induced change in refractive index encountered by a TE electromagnetic polarization mode of said optical signal propagating along said second waveguide core.

43. An integrated optical device as claimed in claim 42 wherein a controller is programmed to establish said voltages applied to said first and second sets of control electrodes to affect said relative phase delay between said TE mode of polarization in said first optical waveguide arm and said TM mode of polarization in said second optical waveguide arm.

44. An integrated optical device as claimed in claim 40 wherein said delay section is configured to define first and second optical waveguide arms of unequal path lengths and wherein a difference between said path lengths results in said relative phase delay between said TE mode of polarization in said first optical waveguide arm and said TM mode of polarization in said second optical waveguide arm.

45. An integrated optical device as claimed in claim 40 wherein said polarization splitter and said polarization combiner each define characteristic switching states controlling whether a TE or TM mode of polarization is directed across waveguide arms, and wherein said polarization splitter and said polarization combiner define identical switching states.

46. An integrated optical device as claimed in claim 40 wherein said polarization splitter and said polarization combiner each comprise first and second optical waveguide arms arranged to define an optical signal splitting region near an input side of said integrated optical device and an optical signal combining region near an output side of said integrated optical device, (ii) a functional region between said optical signal splitting and combining regions, and (iii) a controller coupled to said functional region, and wherein:
said first optical waveguide arm comprises first waveguide core passing through a first electrooptic portion of said functional region;
said second optical waveguide arm comprises a second waveguide core passing through a second electrooptic portion of said functional region;
a first set of control electrodes are positioned to generate an electric field in said first electrooptic portion of said functional region;
a second set of control electrodes arm positioned to generate an electric field in said second electrooptic portion of said functional region;

said first set of control electrodes, said first waveguide core, and said first portion of said functional region are configured such that, upon application of suitable voltage to said first set of control electrodes, as established by said controller, a TE electromagnetic polarization mode of an optical signal propagating along said first waveguide core encounters an electrooptically induced change in refractive index that is more predominant than an electrooptically induced change in refractive index encountered by a TM electromagnetic polarization mode of said optical signal propagating along said first waveguide core;

said second set of control electrodes, said second waveguide core, and said second portion of said functional region are configured such that, upon application of suitable voltage to said second set of control electrodes, as established by said controller, a TM electromagnetic polarization mode of an optical signal propagating along said second waveguide core encounters an electrooptically induced change in refractive index that is more predominant than an electrooptically induced change in refractive index encountered by a TE electromagnetic polarization mode of said optical signal propagating along said second waveguide core; and said controller is programmed to establish said voltages applied to said first and second sets of control electrodes to affect optical coupling at said optical signal combining region of TE and TM polarized portions of said optical signals propagating along said first and second waveguide cores such that one of said first and second waveguide cores following said optical signal combining region includes an enhanced TE signal while the other of said first and ascend waveguide cores following said optical signal combining region includes enhanced TM signal.

47. An integrated optical device as claimed in claim 40 wherein said delay section and said polarization combiner are constructed such that said TE and TM modes of polarization propagating in said first and second optical waveguide arms in said delay section are not subject to significant interference upon propagation to said polarization combiner.

48. An integrated optical device configured to convert a selected TE or TM mode of polarization of an optical signal, said device comprising:
  a polarization splitter configured to direct a TE mode of an input optical signal to a first optical waveguide arm of said device and a TM mode of said input optical signal to a second optical waveguide arm of said device;
  a polarization rotator positioned in one of said first and second optical waveguide arms to rotate a polarization mode of an optical signal following propagation through said polarization splitter;
  a delay section in a propagation path between said polarization splitter and said polarization combiner, wherein said delay section is configured to affect a relative phase delay between signals in said first and second optical waveguide arms; and
  an output coupler configured to combine optical signals of said first and second optical waveguide arms following propagation through said delay section.

49. An integrated optical device as claimed in claim 48 wherein said polarization rotator comprises a half-wave plate.

50. An integrated optical device as claimed in claim 49 wherein said half-wave plate comprises a drop-in filter.

51. A method of converting a selected TE or TM mode of polarization of an optical signal in an integrated optical device, said method comprising:
  splitting TE and TM polarized components of an optical signal with a polarization splitter by directing a TE mode of an input optical signal to a first optical waveguide arm of said device and directing a TM mode of said input optical signal to a second optical waveguide arm of said device;
  rotating a mode of polarization of one of said TE and TM polarized components in one of said first and second optical waveguide arms following of said optical signal through said polarization splitter;
  causing a relative phase delay between optical signals in said first and second optical waveguide arms following said rotation of one of said TE and TM polarized components of said optical signal; and
  combining optical signals of said first and second optical waveguide arms following causation of said relative phase delay.

52. A method as claimed in claim 51 wherein said relative phase delay is caused such that it defines a magnitude sufficient to ensure non-interference of said optical signals of said first and second optical waveguide arms upon said combination.

53. A method as claimed in claim 51 wherein said relative phase delay is caused such that it defines a magnitude sufficient to ensure a selected amount of interference of said optical signals of said first and second optical waveguide arms upon said combination.

54. A method as claimed in claim 53 wherein said selected amount of interference corresponds to a desired atternation of a combined output of said optical signals of said first and second optical waveguide arms.

55. An optical network comprising at least one transmitter, at least one receiver, a network of transmission lines interconnecting said transmitter and said receiver, and at least one integrated optical device, said integrated optical device comprising (i) first and second optical waveguide arms arranged to define an optical signal splitting region near an input side of said integrated optical device and an optical signal combining region near an output side of said integrated optical device and (ii) a functional region between said optical signal splitting and combining regions, wherein:
  said first optical waveguide arm comprises a first waveguide core passing through a first electrooptic portion of said functional region, said first waveguide core being optically non-functional relative to a remaining portion of said functional region;
  said second optical waveguide arm comprises a second waveguide core passing through a second electrooptic portion of said functional region, said second waveguide core being optically non-functional relative to a remaining portion of said functional region;
  a first set of control electrodes are positioned to generate an electric field in said first portion of said functional region;
  a second set of control electrodes are positioned to generate an electric field in said second portion of said functional region;
  said first set of control electrodes, said first waveguide core, and said first portion of said functional region are configured such that a TE electromagnetic polarization mode of an optical signal propagating along said first waveguide core encounters an electrooptically induced change in refractive index that is more predominant than an electrooptically induced change in refractive index encountered by a TM electromagnetic polarization mode of said optical signal propagating along said first waveguide core; and said second set of control electrodes, said second waveguide core, and said second portion of said functional region are configured such that a TM electromagnetic polarization mode of an optical signal propagating along said second waveguide core encounters an electrooptically induced change in refractive index that is more predominant than an electrooptically induced change in refractive index encountered by a TE electromagnetic polarization mode of said optical signal propagating along said second waveguide core.

56. An optical network comprising at least one transmitter, at least one receiver, a network of transmission lines interconnecting said transmitter an said receiver, at least one optical component, a polarization dependent phase shifter, and a phase shift controller, wherein:

said optical component is configured to introduce a polarization dependent phase delay in an optical signal propagating through said optical network;

said polarization dependent phase shifter comprises a non-electrooptic waveguide core passing through an electrooptic portion of a functional region of said phase shifter and a set of control electrodes positioned to generate an electric field in said electrooptic portion of said functional region are configured such that a TE electromagnetic polarization mode of an optical signal propagating along said waveguide core encounters an electrooptically induced change in refractive index that is more or less predominant than an electrooptically induced change in refractive index encountered by a TM electromagnetic polarization mode of said optical signal propagating along said waveguide core; and said controller is programmed to compensate for said polarization dependent phase delay introduced by said optical component by inducing a suitable change in said refractive indices encountered by said TE and TM polarization modes of said optical signal.

57. An optical network as claimed in claim 56 wherein said controller is programmed to compensate for said polarization dependent phase delay in response to an operator command.

58. An optical network as claimed in claim 57 wherein said operator command represents a quantification of said polarization dependent phase delay introduced by said optical component.

59. An optical network as claimed in claim 57 wherein said operator command represents a command directed at initiating a compensation operation.

60. An integrated optical device comprising (i) first and second optical waveguide arms arranged to define an optical signal splitting region near an input side of said integrated optical device and an optical signal combining region near an output side of said integrated optical device and (ii) a functional region between said optical signal splitting and combining regions, wherein:

said first optical waveguide arm comprises a first waveguide core passing through a first portion of said functional region, said first waveguide core being optically non-functional relative to a remaining portion of said functional region;

said second optical waveguide arm comprises a second waveguide core passing through a second portion of said functional region, said second waveguide core being optically non-functional relative to a remaining portion of said functional region;

said first waveguide core and said first portion of said functional region are configured such that a TE electromagnetic polarization mode of an optical signal propagating along said first waveguide core encounters an change in refractive index that is more predominant than a change in refractive index encountered by a TM electromagnetic polarization mode of said optical signal propagating along said first waveguide core; and said second waveguide core and said second portion of said functional region are configured such that a TM electromagnetic polarization mode of an optical signal propagating along said second waveguide core encounters a change in refractive index that is more predominant than a change in refractive index encountered by a TE electromagnetic polarization mode of said optical signal propagating along said second waveguide core.

61. An integrated optical device as claimed in claim 60 wherein said integrated optical device is configured such that said respective changes in refractive indices are induced optically, electrooptically, thermooptically, or magnetooptically.

* * * * *

UNITED STATES PATENT AND TRADEMARK OFFICE
CERTIFICATE OF CORRECTION

PATENT NO. : 6,853,758 B2
DATED : February 8, 2005
INVENTOR(S) : Richard W. Ridgway et al.

It is certified that error appears in the above-identified patent and that said Letters Patent is hereby corrected as shown below:

Column 9,
Line 56, "$r_{PP1,}$"; should read -- $r_{PP1\ and}$ --;

Column 20,
Line 13, "through second" should read -- through a second --;

Column 26,
Line 33, "atternation" should be -- attenuation --; and

Column 27,
Line 17, "transmitter an" should read -- transmitter and --.

Signed and Sealed this

Seventh Day of June, 2005

JON W. DUDAS
*Director of the United States Patent and Trademark Office*